(12) United States Patent
Jamison et al.

(10) Patent No.: US 9,513,110 B2
(45) Date of Patent: Dec. 6, 2016

(54) METHODS FOR DETERMINING MECHANICAL QUANTITIES ASSOCIATED WITH A DEFORMATION FORCE BY UTILIZING AN INTEGRATED COMPUTATIONAL ELEMENT

(71) Applicant: Halliburton Energy Services, Inc., Houston, TX (US)

(72) Inventors: Dale E. Jamison, Humble, TX (US); Cato Russell McDaniel, Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 197 days.

(21) Appl. No.: 14/403,223

(22) PCT Filed: Jan. 31, 2014

(86) PCT No.: PCT/US2014/014101
§ 371 (c)(1),
(2) Date: Nov. 24, 2014

(87) PCT Pub. No.: WO2015/116153
PCT Pub. Date: Aug. 6, 2015

(65) Prior Publication Data
US 2016/0273911 A1 Sep. 22, 2016

(51) Int. Cl.
*G01B 11/16* (2006.01)
*G01L 1/25* (2006.01)
*G01L 1/24* (2006.01)

(52) U.S. Cl.
CPC .............. *G01B 11/16* (2013.01); *G01L 1/241* (2013.01); *G01L 1/25* (2013.01)

(58) Field of Classification Search
CPC .............. G01L 1/18; G01L 1/16; G01L 1/246; G01L 1/005; G01L 1/205; G01L 1/24;G01L 1/20; G01L 1/2287; G01L 1/242; G01L 1/248; G01L 5/0038; G01L 11/025; G01L 19/00; G01L 19/086; G01L 1/06

See application file for complete search history.

(56) References Cited

U.S. PATENT DOCUMENTS 6,198,531 B1  3/2001  Myrick et al.
6,529,276 B1  3/2003  Myrick
(Continued)

FOREIGN PATENT DOCUMENTS

WO     2015/116153 A1    8/2015

OTHER PUBLICATIONS

International Search Report and Written Opinion for PCT/US2014/014101 dated Oct. 31, 2014.
(Continued)

*Primary Examiner* — Michael P Stafira
(74) *Attorney, Agent, or Firm* — McDermott Will & Emery LLP; Tenley Krueger

(57) ABSTRACT

Mechanical quantities associated with a deformation force impacting a structure may be determined using one or more integrated computational elements. Methods for determining a mechanical quantity may comprise: optically interacting electromagnetic radiation with one or more integrated computational elements and a target area of a structure, the structure comprising a deformable material in an initial amount and a reference material in an initial amount within the target area; exposing the structure to a deformation force; determining a change in amount of the deformable material or the reference material within the target area, using the one or more integrated computational elements; and correlating the change in amount of the deformable material or the reference material within the target area to a mechanical quantity associated with the deformation force.

23 Claims, 11 Drawing Sheets

(56) References Cited

U.S. PATENT DOCUMENTS

| | | |
|---|---|---|
| 7,123,844 B2 | 10/2006 | Myrick |
| 7,138,156 B1 | 11/2006 | Myrick et al. |
| 7,834,999 B2 | 11/2010 | Myrick et al. |
| 7,911,605 B2 | 3/2011 | Myrick et al. |
| 7,920,258 B2 | 4/2011 | Myrick et al. |
| 2009/0073433 A1 | 3/2009 | Myrick et al. |
| 2009/0182693 A1 | 7/2009 | Fulton et al. |
| 2009/0213381 A1 | 8/2009 | Appel et al. |
| 2009/0219538 A1 | 9/2009 | Myrick et al. |
| 2009/0219539 A1 | 9/2009 | Myrick et al. |
| 2010/0265509 A1 | 10/2010 | Jones et al. |
| 2012/0150451 A1 | 6/2012 | Skinner et al. |
| 2013/0284894 A1 | 10/2013 | Freese et al. |
| 2013/0284895 A1 | 10/2013 | Freese et al. |
| 2013/0284896 A1 | 10/2013 | Freese et al. |
| 2013/0284897 A1 | 10/2013 | Freese et al. |
| 2013/0284898 A1 | 10/2013 | Freese et al. |
| 2013/0284899 A1 | 10/2013 | Freese et al. |
| 2013/0284900 A1 | 10/2013 | Freese et al. |
| 2013/0284901 A1 | 10/2013 | Freese et al. |
| 2013/0284904 A1 | 10/2013 | Freese et al. |

OTHER PUBLICATIONS

Liu et al., Electrospun PEDOT:PSS-PVA Nanofiber Based Ultra-high-Strain Sensors with Controllable Electrical Conductivity, Journal of Materials Chemistry, 2011, 21, 18962-18966.

Fudouzi et al., Photonic Rubber Sheets with Tunable Color by Elastic Deformation, Langmuir 2006, 22, 1365-1368.

http://www.correlatedsolutions.com/digital-image-correlation, printed Nov. 21, 2014, pp. 1-4.

METHODS FOR DETERMINING MECHANICAL QUANTITIES ASSOCIATED WITH A DEFORMATION FORCE BY UTILIZING AN INTEGRATED COMPUTATIONAL ELEMENT

BACKGROUND

The present disclosure generally relates to the determination of mechanical quantities, and, more specifically, to methods utilizing one or more integrated computational elements for determining one or more mechanical quantities associated with a deformation force impacting a structure.

Issues with monitoring structural changes over time are becoming increasingly important due to the growing breadth of aging infrastructure throughout the United States and other countries. A number of breakdown factors, such as structural fatigue and like failure mechanisms, can impact a structure over time and may eventually make the structure unsuitable for its originally intended application. Such factors can include, but are not limited to, routine "wear and tear," damage from chemical or environmental exposure, damage from applied loads or other displacement forces, internal stress, combinations thereof, and the like. As used herein, the term "structure" refers to any body having any shape and any function. In some instances, structural changes resulting from breakdown factors can be readily discerned with the naked eye. For example, surface cracking or large shape deformations may be readily observed with the naked eye. In other instances, however, structural changes may be much more subtle and difficult to discern, particularly those that occur internally within a structure.

In many instances, it can be desirable to quantify the degree of structural changes that have been experienced by a structure in order to determine if the structure has exceeded its working tolerances and structural failure is imminent. The degree of structural changes within a structure may often be measured by quantifying the conditions to which a structure has been exposed or is being exposed. Although a number of contact and non-contact sensors have been developed to monitor a wide range of environmental conditions including, but not limited to, temperature, pressure, moisture, and shock, these conditions may only provide limited value in quantifying structural breakdown. The direct measurement of displacement forces that are more directly associated with structural breakdown are often much more difficult to readily discern. Particularly in large structures, the sheer amount of structural surface area may represent a significant impediment to adequate structural characterization. Further, with many types of sensors, failure over the long term can present a significant concern.

In some instances, sensors may be incorporated within the body of a structure without significantly impacting the structure's intended function. In this regard, there has been some progress in incorporating nanomaterials within "smart" structures, in which the nanomaterials provide an internal sensing function. However, the incorporation of nanomaterials has not proven universally applicable to all types of structures or for measuring certain types of conditions impacting a structure. Moreover, nanomaterials can sometimes be expensive, and the sensing equipment for electrically or spectroscopically interrogating the nanomaterials may also be expensive and sensitive to field or process environments. Further, for spectral analyses, complicated deconvolution techniques can be required when interfering substances are present, particularly when analyzing a nanomaterial in low abundance.

With many types of sensors, feedback to an observer may not occur quickly enough for proactive control of a system or process to take place. For example, it may often be the case that a condition has already exceeded a threshold limit before it is even detected. Further, some types of sensors may require frequent calibration or inspection due to potential drift. Any of these factors can result in costly system or process downtime, either to respond to damage that has already occurred or to perform maintenance that prevents damage from occurring. Many applications could significantly benefit from robust sensors able to provide real-time or near real-time output of a wide range of conditions being monitored.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
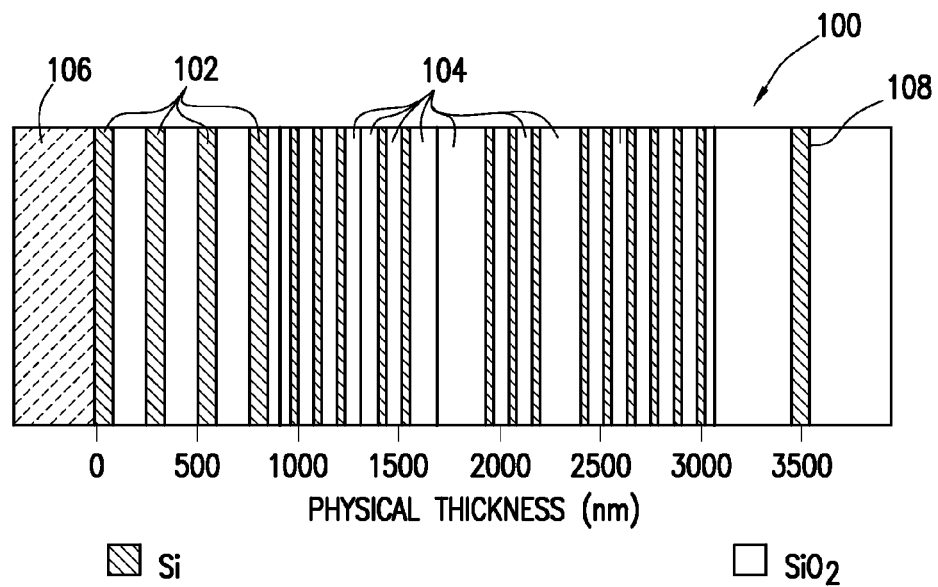
FIG. 1 shows a schematic of an illustrative integrated computational element (ICE).

The present disclosure generally relates to the determination of mechanical quantities, and, more specifically, to methods utilizing one or more integrated computational elements for determining one or more mechanical quantities associated with a deformation force impacting a structure.

One or more illustrative embodiments incorporating the disclosure herein are presented below. Not all features of an actual implementation are described or shown in this application for the sake of clarity. It is to be understood that in the development of an actual embodiment incorporating the present disclosure, numerous implementation-specific decisions must be made to achieve the developer's goals, such as compliance with system-related, business-related, government-related and other constraints, which may vary by implementation and from time to time. While a developer's efforts might be complex and time-consuming, such efforts would be, nevertheless, a routine undertaking for one having ordinary skill in the art and the benefit of this disclosure.

As described above, conventional sensors and sensing techniques may be somewhat limited in their response times, durability, and other features, particularly those involving spectroscopic interrogation techniques. In contrast to conventional spectroscopic analyses, the methods described herein utilize optical computing devices containing one or more integrated computational elements (ICE) in conjunction with analyzing for changes in the amount(s) of one or more components within a structure. Based on this determination, a correlation to one or more mechanical quantities associated with a deformation force impacting the structure may be made. Further disclosure regarding integrated computational elements and their advantages in this regard follows below.

More particularly, the sensing techniques described herein utilize one or more integrated computational elements to analyze for changes that take place in the amount of a given material within a target area on a structure when the structure experiences a deformation force. The nature of the deformation force is not believed to be particularly limited and may come from within the structure, external to the structure, or any combination thereof. In some embodiments, the deformation force may arise from an externally applied load, such as a compressive load, a tensile load, or a shearing load that imparts a torque to the structure. In some or other embodiments, the deformation force may arise from fluid pressure being applied to the structure. In still other embodiments, the deformation force may arise from thermal expansion or contraction of the structure. Regardless of the nature of the deformation force, a structure may be configured such that it can be readily interrogated using an integrated computational element to determine a change in the amount of one or more materials therein, thereby allowing a mechanical quantity associated with the deformation force to be determined. In this regard, the embodiments described herein may be particularly advantageous for measuring deformation forces over a wide range, which may be beyond the calibration region of conventional sensors. Before providing a further description of how a structure may be configured to realize the foregoing, a more thorough description of integrated computational elements, their configuration and construction, and their advantages will be provided below.

Each integrated computational element within an optical computing device can be specifically configured to analyze for a particular material, even when other materials are present, including those that may interfere with conventional spectroscopic analyses. Therefore, the sensing techniques described herein may be applicable to structures having a wide breadth of constituent materials, not just those that are readily analyzed by a particular type of spectroscopic analysis. Not only are integrated computational elements less affected by the presence of interferents compared to conventional spectroscopic techniques, but they are also much more robust and less sensitive to corruption by field or process environments. Moreover, integrated computational elements and their associated hardware can produce extremely rapid analytical output, thereby making them suitable for analyses conducted in real-time or near real-time. In this regard, integrated computational elements may, in some embodiments, allow a mechanical quantity to be determined while a deformation force is being experienced by the structure, thereby providing a means of real-time or near real-time process control. By having access to real-time or near real-time values of a mechanical quantity, the mechanical quantity may be kept below a threshold limit in order to avoid potential damage to various structural components.

The theory behind optical computing and a description of some conventional optical computing devices are provided in more detail in the following commonly owned United States Patents and United States Patent Application Publications: U.S. Pat. Nos. 6,198,531; 6,529,276; 7,123,844; 7,834,999; 7,911,605; 7,920,258; 2009/0219538; 2009/0219539; and 2009/0073433. As the theory behind optical computing and configuring integrated computational elements present therein lies within the knowledge of one having ordinary skill in the art, a detailed description of such will not be provided herein unless needed to better describe one or more embodiments of the present disclosure. Unlike conventional spectroscopic instruments, which produce a spectrum needing further interpretation to obtain a result, the ultimate output of optical computing devices is a real number that can be correlated in some manner with a characteristic of a material being analyzed. In the embodiments described herein, integrated computational elements may be utilized to determine the amount of a material in a target area on a structure in order to measure a mechanical quantity, but one of ordinary skill in the art will recognize that other measurable characteristics of a material may also be determined using an integrated computational element.

Figure 4:
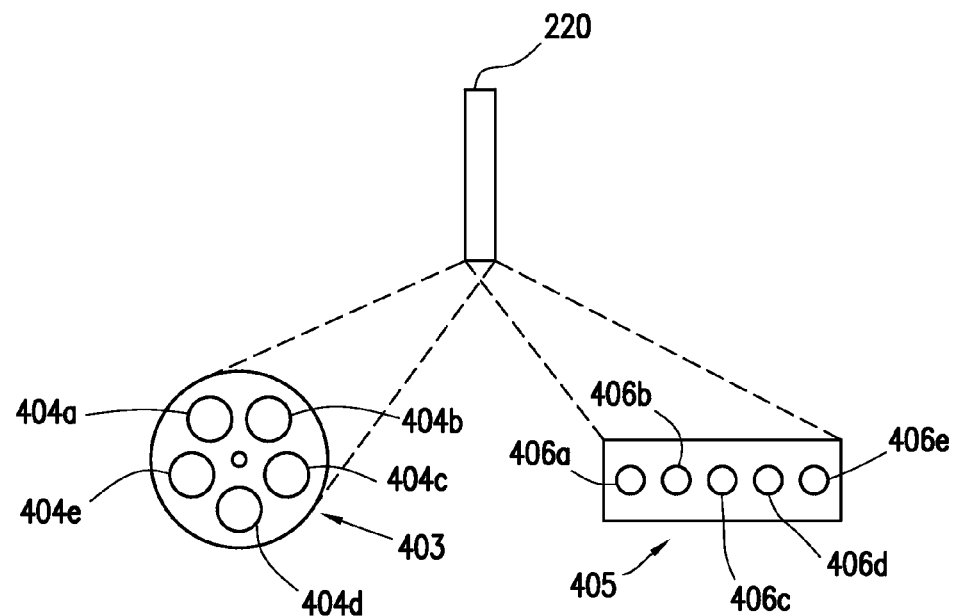
FIG. 4 shows a schematic of illustrative arrays of integrated computational elements.

In addition to the benefits described above, significant detection enhancement can sometimes be realized by combining the outputs from two or more integrated computational elements with one another, even when analyzing a single material of interest. Techniques for combining the outputs of two or more integrated computational elements with one another, particularly computationally combining the outputs, are described in the following commonly owned United States Patent Application Publications: 20130284894, 20130284895, 20130284896, 20130284897, 20130284898, 20130284899, 20130284900, 20130284904 and 20130284901, each filed on Apr. 26, 2012. Although the methods presented herein are largely described without reference to combining the outputs of integrated computational elements with one another, it is to be recognized that the methods are not to be limited in this respect. That is, any of the methods described herein may also be carried out by combining the outputs of two or more integrated computational elements with one another. The integrated computational elements whose outputs are being combined with one another may be associated or disassociated with the material being analyzed, display a positive or negative response when analyzing the material, or any combination thereof. Illustrative configurations of optical computing devices containing two or more integrated computational elements are shown in FIG. 4 and described in more detail hereinbelow.

As used herein, the term "load" refers to an external force that is applied to a structure and results in a deformation therein.

As used herein, the term "deformation force" refers to a force acting upon a structure that results in a displacement of the structure from its original condition.

As used herein, the term "deformable material" refers to a substance that undergoes expansion or contraction (i.e., displacement) when exposed to a deformation force. In some embodiments, the deformable material may be an elastically deformable material, in which case the material is deformed when exposed to a deformation force and then returns to its original state when the deformation force is no longer present. In other embodiments, the deformable material may be an inelastically deformable material, in which case a material deformed upon exposure to a deformation force remains at least partially deformed once the deformation force is no longer present. In general, according to the embodiments described herein, a deformable material undergoes more deformation in response to a deformation force than does a reference material that is also present. In some embodiments, the reference material may be substantially non-deformable in the presence of the deformation force.

As used herein, the term "electromagnetic radiation" refers to radio waves, microwave radiation, infrared and near-infrared radiation, visible light, ultraviolet radiation, X-ray radiation, and gamma ray radiation.

As used herein, the term "optically interact" and variants thereof refer to the reflection, transmission, scattering, diffraction, or absorption of electromagnetic radiation through or from a structure or one or more integrated computational elements. Accordingly, optically interacted electromagnetic radiation refers to electromagnetic radiation that has been reflected, transmitted, scattered, diffracted, absorbed, emitted, or radiated from a structure or an integrated computational element.

As used herein, the term "optical computing device" refers to an optical device that is configured to receive an input of electromagnetic radiation from a structure containing a substance to be assayed and produce an output of electromagnetic radiation from a processing element arranged within the optical computing device. The electromagnetic radiation may optically interact with the structure before or after optically interacting with the optical computing device. The processing element may be, for example, an integrated computational element (ICE), also known as a multivariate optical element (MOE) or an ICE CORE (Halliburton Energy Services), an illustrative example of which is described in more detail below. The electromagnetic radiation that optically interacts with the processing element may be changed so as to be readable by a detector, such that an output of the detector can be correlated to a quantity of a substance that is present in the structure. The output of electromagnetic radiation from the processing element can comprise reflected, transmitted, and/or dispersed electromagnetic radiation. Whether the detector analyzes reflected, transmitted, or dispersed electromagnetic radiation may be dictated by the structural parameters of the optical computing device as well as other considerations that may become evident to one having ordinary skill in the art. In addition, whether reflected, transmitted, or dispersed electromagnetic radiation is being analyzed may affect the manner in which the value of the mechanical quantity is calculated based on the output of the integrated computational element, as discussed further below. Further to the above, emission and/or scattering of the electromagnetic radiation, for example, via fluorescence, luminescence, Raman, Mie, and/or Raleigh scattering, can also be monitored by the optical computing devices.

As used herein, the terms "real-time" and "near real-time" refer to an output from an integrated computational element that is produced on substantially the same time scale as the optical interrogation of a substance with electromagnetic radiation. That is, a "real-time" or "near real-time" output does not take place offline after data acquisition and post-processing techniques. An output that is returned in "real-time" may be returned essentially instantaneously. A "near real-time" output may be returned after a brief delay, which may be associated with processing or data transmission time, or the like. It will be appreciated by one having ordinary skill in the art that the rate at which an output is received may be dependent upon the processing and data transmission rate.

FIG. 1 shows a schematic of an illustrative integrated computational element (ICE) 100. As illustrated in FIG. 1, ICE 100 may include a plurality of alternating layers 102 and 104 of varying thicknesses disposed on optical substrate 106. In general, the materials forming layers 102 and 104 have indices of refraction that differ (i.e., one has a low index of refraction and the other has a high index of refraction), such as Si and $SiO_2$. Other suitable materials for layers 102 and 104 may include, but are not limited to, niobia and niobium, germanium and germania, MgF, and SiO. Additional pairs of materials having high and low indices of refraction can be envisioned by one having ordinary skill in the art, and the composition of layers 102 and 104 is not considered to be particularly limited. In some embodiments, the material within layers 102 and 104 can be doped, or two or more materials can be combined in a manner to achieve a desired optical response. In addition to solids, ICE 100 may also contain liquids (e.g., water) and/or gases, optionally in combination with solids, in order to produce a desired optical response. The material forming optical substrate 106 is not considered to be particularly limited and may comprise, for example, BK-7 optical glass, quartz, sapphire, silicon, germanium, zinc selenide, zinc sulfide, various polymers (e.g., polycarbonates, polymethylmethacrylate, polyvinylchloride, and the like), diamond, ceramics, and the like. Opposite to optical substrate 106, ICE 100 may include layer 108 that is generally exposed to the environment of the device or installation in which it is used.

The number, thickness, and spacing of layers 102 and 104 may be determined using a variety of approximation methods based upon a conventional spectroscopic measurement of a sample of a material of interest. These methods may include, for example, inverse Fourier transform (IFT) of the optical transmission spectrum and structuring ICE 100 as a physical representation of the IFT. The approximation methods convert the IFT into an assembly of layers based on known materials with constant refractive indices.

It should be understood that illustrative ICE 100 of FIG. 1 has been presented for purposes of illustration only. Thus, it is not implied that ICE 100 is predictive for any particular material. Furthermore, it is to be understood that layers 102 and 104 are not necessarily drawn to scale and should therefore not be considered as limiting of the present disclosure. Moreover, one having ordinary skill in the art will readily recognize that the materials comprising layers 102 and 104 may vary depending on factors such as, for example, the types of substances being analyzed and the ability to accurately conduct their analysis, cost of goods, chemical compatibility issues, and the like.

The weightings that the layers 102 and 104 of ICE 100 apply at each wavelength are set to the regression weightings described with respect to a known equation, data, or spectral signature. Briefly, ICE 100 may be configured to perform the dot product of the input electromagnetic radiation into ICE 100 and produce a desired loaded regression vector represented by each layer 102 and 104 for each wavelength. As a result, the output electromagnetic radiation intensity of ICE 100 may be correlated to the amount of a given material, which may in turn be correlated to a mechanical property associated with a deformation force impacting a structure. Further details regarding how ICE 100 is able to distinguish and process electromagnetic radiation are described in U.S. Pat. Nos. 6,198,531, 6,529,276, and 7,920,258, each referenced above.

It is to be recognized that the embodiments herein may be practiced with various blocks, modules, elements, components, methods and algorithms, which can be implemented through using computer hardware, software and combinations thereof. To illustrate this interchangeability of hardware and software, various illustrative blocks, modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the spirit and scope of the embodiments expressly described.

Computer hardware used to implement the various illustrative blocks, modules, elements, components, methods and algorithms described herein can include a processor configured to execute one or more sequences of instructions, programming or code stored on a readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable (PROM), registers, hard disks, removable disks, CD-ROMS, DVDs, or any other like suitable storage device.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and software.

As used herein, a machine-readable medium will refer to any non-transitory medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Figure 2:
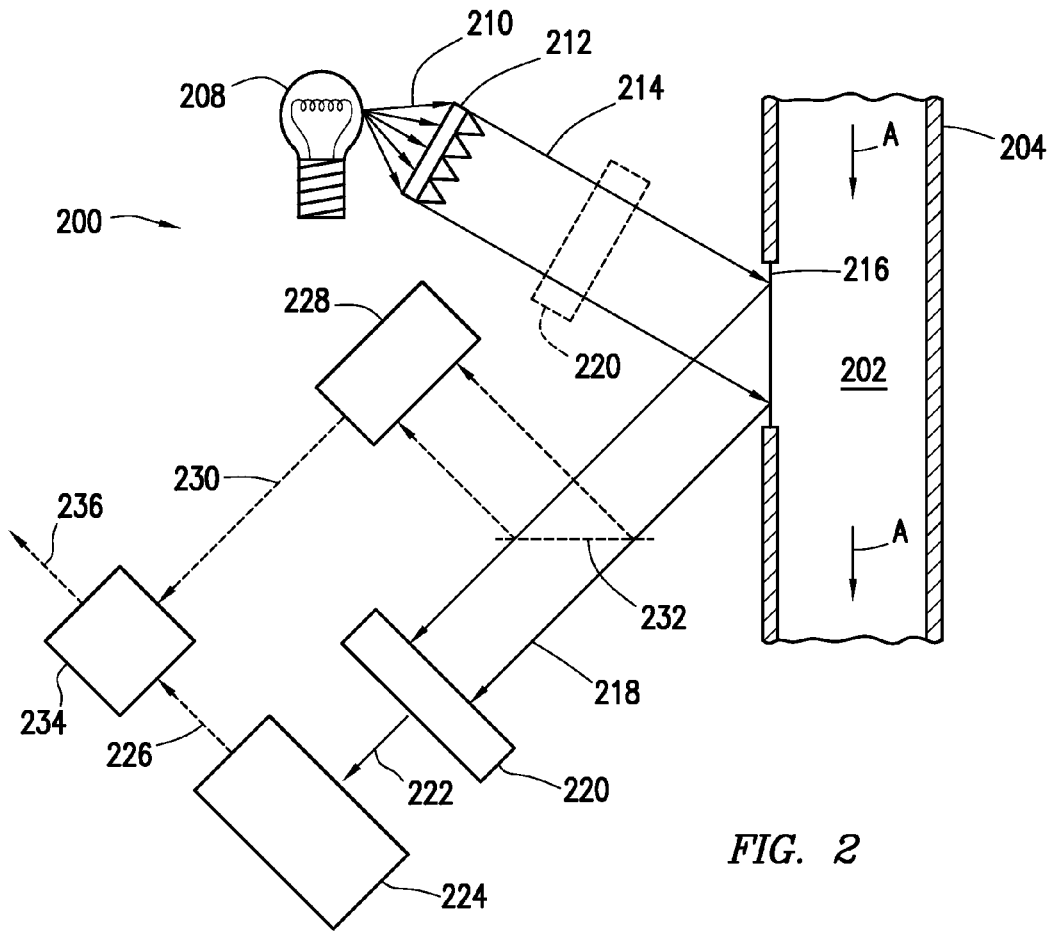
FIGS. 2 and 3 show schematics of illustrative optical computing devices employing an integrated computational element.
Figure 3:
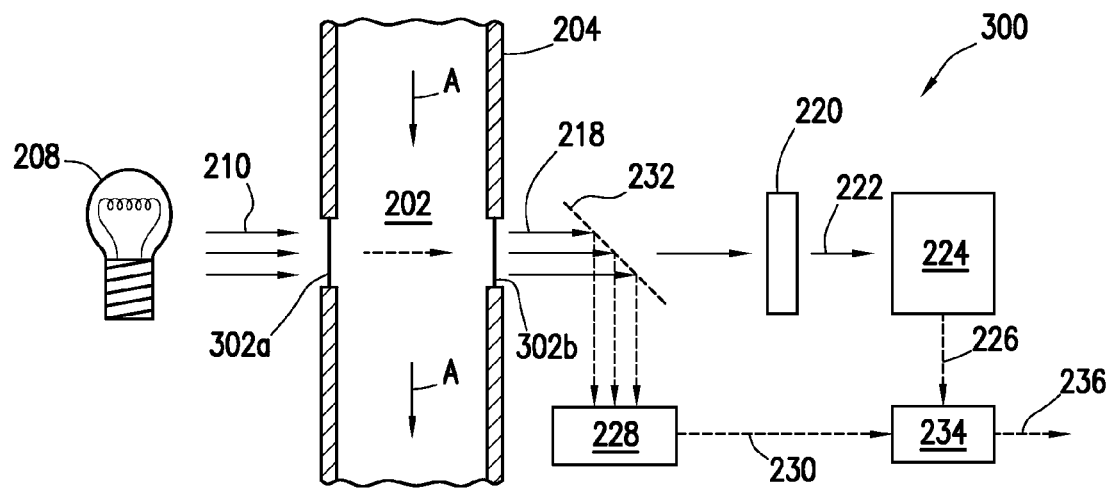

Illustrative configurations for optical computing devices containing a single integrated computational element will now be described in more detail. It is to be recognized that the device configurations depicted in FIGS. 2 and 3 are illustrative in nature only and can be modified extensively to accommodate the requirements of a particular analysis. As non-limiting examples, the single integrated computational elements of FIGS. 2 and 3 may be replaced by multiple integrated computational elements, the outputs of which may or may not be computationally combined with one another. In some embodiments, multiple integrated computational elements may be placed in series or parallel, or disposed on a movable assembly, such that electromagnetic radiation optically interacts with different integrated computational elements over time, as depicted in FIG. 4. The different integrated computational elements may be used to analyze for distinct materials present in a given structure (e.g., a deformable material and a reference material), or the output from two or more integrated computational elements may be computationally combined to assay for a single material of interest.

FIG. 2 shows an illustrative optical computing device 200 configured for monitoring fluid 202 by reflection, according to one or more embodiments. In the illustrated embodiment, fluid 202 may be contained or otherwise flowing within flow path 204. Flow path 204 may be a flow line, a pipeline, or the like. Fluid 202 within flow path 204 may be flowing in the general direction indicated by the arrows A (i.e., from upstream to downstream). Portions of flow path 204 may be arranged substantially vertically, substantially horizontally, or any directional configuration therebetween, without departing from the scope of the disclosure. It is to be recognized that solid materials may be analyzed in a like configuration to that depicted in FIG. 2, except they are generally stationary when being analyzed. That is, flow path 204 may be replaced by a solid structure in such embodiments.

Optical computing device 200 may be configured to analyze a substance within fluid 202, such as a concentration of the substance in fluid 202. Device 200 may include electromagnetic radiation source 208 configured to emit or otherwise generate electromagnetic radiation 210. Electromagnetic radiation source 208 may be any device capable of emitting or generating electromagnetic radiation, as defined herein. For example, electromagnetic radiation source 208 may be a light bulb, a light emitting diode (LED), a laser, a blackbody, a photonic crystal, an X-Ray source, any combination thereof, and the like. In some embodiments, lens 212 may be configured to collect or otherwise receive electromagnetic radiation 210 and direct beam 214 of electromagnetic radiation 210 toward fluid 202. Lens 212 may be any type of optical device configured to transmit or otherwise convey electromagnetic radiation 210 as desired, such as a normal lens, a Fresnel lens, a diffractive optical element, a holographic graphical element, a mirror (e.g., a focusing mirror), or a type of collimator. In some embodiments, lens 212 may be omitted from device 200 and electromagnetic radiation 210 may instead be directed toward fluid 202 directly from electromagnetic radiation source 208.

In some embodiments, device 200 may also include sampling window 216 arranged adjacent to or otherwise in contact with fluid 202 for detection purposes. Sampling window 216 may be made from a variety of transparent, rigid or semi-rigid materials that are configured to allow transmission of electromagnetic radiation 210 therethrough. For example, sampling window 216 may be made of glasses, plastics, semiconductors, crystalline materials, polycrystalline materials, hot or cold-pressed powders, any combination thereof, and the like. After passing through sampling window 216, electromagnetic radiation 210 impinges upon and optically interacts with fluid 202. As a result, optically interacted electromagnetic radiation 218 is generated by and reflected from fluid 202. It is to be recognized, however, that alternative configurations of device 200 may allow optically interacted electromagnetic radiation 218 to be generated by being transmitted, scattered, diffracted, absorbed, emitted, or re-radiated by and/or from fluid 202, without departing from the scope of this disclosure.

Optically interacted electromagnetic radiation 218 generated by the interaction with fluid 202 may be directed to or otherwise be received by ICE 220 arranged within the device 200. ICE 220 may be a spectral component substantially similar to ICE 100 described above with reference to FIG. 1. Accordingly, ICE 220 may be configured to receive the optically interacted electromagnetic radiation 218 and produce modified electromagnetic radiation 222 corresponding to the concentration of a component within fluid 202. In particular, modified electromagnetic radiation 222 is electromagnetic radiation that has optically interacted with ICE 220, whereby an approximation of the regression vector corresponding to the fluid component is obtained.

While FIG. 2 depicts ICE 220 as receiving reflected electromagnetic radiation from fluid 202, ICE 220 may be arranged at any point along the optical train of device 200, without departing from the scope of this disclosure. For example, in one or more embodiments, ICE 220 (as shown in dashed) may be arranged within the optical train prior to sampling window 216, while obtaining substantially the same results. In other embodiments, ICE 220 may generate modified electromagnetic radiation 222 through reflection, instead of transmission therethrough.

Modified electromagnetic radiation 222 generated by ICE 220 may subsequently be conveyed to detector 224 for quantification of the signal. Detector 224 may be any device capable of detecting electromagnetic radiation, and may be generally characterized as an optical transducer. In some embodiments, detector 224 may include devices such as, but not limited to, a thermal detector such as a thermopile or photoacoustic detector, a semiconductor detector, a piezoelectric detector, a charge coupled device (CCD) detector, a video or array detector, a split detector, a photon detector (such as a photomultiplier tube), a photodiode, any combination thereof, and the like. Other detectors known to one having ordinary skill in the art may also be used.

In some embodiments, detector 224 may be configured to produce output signal 226 in real-time or near real-time in the form of a voltage (or current) that corresponds to a concentration of the substance of interest in fluid 202. The voltage returned by detector 224 is essentially the dot product of the optical interaction of optically interacted electromagnetic radiation 218 with ICE 220 as a function of the magnitude of the quantity of the substance that is present. As such, output signal 226 produced by detector 224 and the amount of the substance in fluid 202 may be related, such as directly proportional, for example. In other embodiments, however, the relationship may correspond to a polynomial function, an exponential function, a logarithmic function, and/or a combination thereof. The amount of the substance may then be further correlated with a mechanical property, as described in further detail below.

In some embodiments, device 200 may include second detector 228, which may be similar to first detector 224 in that it may be any device capable of detecting electromagnetic radiation. Second detector 228 may be used to detect radiating deviations stemming from electromagnetic radiation source 208. Undesirable radiating deviations can occur in the intensity of electromagnetic radiation 210 due to a wide variety of reasons and potentially cause various negative effects on device 200. These negative effects can be particularly detrimental for measurements taken over a period of time. In some embodiments, radiating deviations can occur as a result of a build-up of film or material on sampling window 216, which may have the effect of reducing the amount and quality of electromagnetic radiation ultimately reaching first detector 224. Without proper compensation, such radiating deviations may result in false readings that result in output signal 226 no longer being correlatable with the amount of a substance of interest that is present.

To compensate for radiating deviations, second detector 228 may be configured to generate compensating signal 230 that is generally indicative of the radiating deviations of electromagnetic radiation source 208, thereby normalizing output signal 226 generated by first detector 224. As illustrated, second detector 228 may be configured to receive a portion of optically interacted electromagnetic radiation 218 via beamsplitter 232 in order to detect the radiating deviations. In other embodiments, however, second detector 228 may be arranged to receive electromagnetic radiation from any portion of the optical train in device 200 in order to detect the radiating deviations, without departing from the scope of this disclosure.

In some embodiments, output signal 226 and compensating signal 230 may be conveyed to or otherwise received by signal processor 234 that is communicably coupled to both of detectors 224 and 228. Signal processor 234 may be a computer including a processor and a machine-readable storage medium having instructions stored thereon, which, when executed by signal processor 234, result in optical computing device 200 performing a number of operations, such as determining a quantity of a substance of interest that is present in fluid 202. Signal processor 234 may utilize an artificial neural network, such as those described in commonly owned United States Patent Application Publication 20090182693. Signal processor 234 may also be configured to computationally combine the outputs of two or more integrated computational elements, if desired, for assaying a particular material of interest.

In real-time or near real-time, signal processor 234 may be configured to provide output signal 236 corresponding to an amount of a substance that is present in fluid 202. Output signal 236 may be readable by an operator who can consider the results and take appropriate action, if needed. In some embodiments, output signal 236 may be conveyed, either wired or wirelessly, to an operator for consideration. In other embodiments, output signal 236 may be recognized by signal processor 234 as being within or outside a predetermined or preprogrammed range of suitable values for operation and may alert an operator in the event of an out-of-range value. In still other embodiments, signal processor 234 may autonomously undertake an appropriate corrective action in order to return output signal 236 to within a desired range.

FIG. 3 shows an illustrative optical computing device 300 configured for monitoring a fluid 202 by transmission, according to one or more embodiments. Optical computing device 300 may be similar in some respects to optical computing device 200 of FIG. 2, and therefore may be best understood with reference thereto, where like reference characters have been used to enumerate elements having similar functions. Unlike device 200, however, optical computing device 300 of FIG. 3 may be configured to transmit electromagnetic radiation 210 through fluid 202 via first sampling window 302a and second sampling window 302b arranged radially-opposite first sampling window 302a on flow path 204. First and second sampling windows 302a and 302b may be similar to sampling window 216 described above in FIG. 2 and therefore will not be described in detail again. It is again to be recognized that solid materials may be analyzed in a like manner to that depicted in FIG. 3, except they are generally stationary when being analyzed, with the electromagnetic radiation being transmitted through the solid.

As electromagnetic radiation 210 passes through fluid 202 via first and second sampling windows 302a and 302b, it optically interacts with fluid 202, and optically interacted electromagnetic radiation 218 is subsequently directed to or is otherwise received by ICE 220. It is again noted that ICE 220 may be arranged at any point along the optical train of the device 300, without departing from the scope of this disclosure. For example, in one or more embodiments, ICE 220 may be arranged within the optical train prior to first sampling window 302a. In yet other embodiments, ICE 220 may generate modified electromagnetic radiation 222 through reflection, instead of transmission therethrough.

Modified electromagnetic radiation 222 generated by ICE 220 is subsequently conveyed to detector 224 for quantification of the signal and generation of output signal 226, which may correspond to a quantity of a substance of interest that is present. Device 300 may also include second detector 228 for detecting radiating deviations stemming from electromagnetic radiation source 208. As illustrated, second detector 228 may be configured to receive a portion of the optically interacted electromagnetic radiation 218 via beamsplitter 232 in order to detect radiating deviations and produce compensating signal 230. Output signal 226 and compensating signal 230 may then be conveyed to or otherwise received by signal processor 234 to provide, in real-time or near real-time, output signal 236 that corresponds to an amount of a substance in fluid 202.

In some embodiments, the single ICE 220 of FIGS. 2 and 3 may be replaced by an assembly of integrated computational elements, as illustratively depicted in FIG. 4. By moving the integrated computational elements of the depicted assemblies with respect to the electromagnetic radiation, different integrated computational elements may be exposed to the electromagnetic radiation over time. In some embodiments, the assembly may comprise rotating disc 403 containing integrated computational elements 404a-404e thereon. In other embodiments, the assembly may comprise movable member 405 having integrated computational elements 406a-406e thereon, in which movable member 405 is shifted or reciprocated laterally over the course of time to expose integrated computational elements 406a-406e to electromagnetic radiation. It is to be recognized that although the assemblies of FIG. 4 have been depicted with five integrated computational elements in the assemblies, any number may be present.

As alluded to above, the illustrative optical computing devices depicted in FIGS. 2 and 3, or any other optical computing device configuration, can be used to interrogate a structure comprising a solid by substituting a solid structure for flow path 204. By interrogating a structure in this manner, the amount of a material of interest or a change thereof within a target region of the structure may then be determined. In some embodiments, the amount of material in the target region may comprise a surface measurement determined by reflectance, in which case the quantity of material below the surface does not appreciably affect the measured amount of the material. In contrast, the amount of the material of interest measured by transmission may comprise the total amount of the material within the target region. Once known, the amount of the material of interest may then be correlated with a mechanical quantity associated with a deformation force being experienced by the structure. Correlation of the amount of the material or its change in the target region of the structure may take place by comparing the numerical output of the optical computing device with a numerical value of the mechanical quantity measured under like conditions. Specifically, the value of a mechanical quantity may be determined under a known applied load, and the output of the optical computing device may be obtained under the same applied load. A calibration function may be developed over a range of applied loads, thereby allowing an output of the optical computing device to be compared to known mechanical quantities over a range of values. In some embodiments, the correlation between the output of the optical computing device (i.e., corresponding to an amount of a material present in a target region of a structure) and the value of a mechanical quantity may vary in direct proportion to one another. In other embodiments, the correlation may represent a more complex function such as a polynomial, exponential or logarithmic function, for example. In some embodiments, the optical computing device may be configured to perform the correlation directly, such that the optical computing device directly outputs the value of the mechanical quantity, rather than providing an amount of a material of interest that is subsequently correlated.

As mentioned above, a structure may be configured such that a material therein is readily quantifiable using one or more integrated computational elements, according to one or more embodiments of the present disclosure. More particularly, a structure may be configured such that the change in amount of a given material within a target area of the structure may be determined using one or more integrated computational elements after or while the structure undergoes deformation, such that the change in amount of the material may be correlated with a mechanical quantity producing the deformation. Particular configurations of structures that may be interrogated by one or more integrated computational elements located proximate to the structure are described hereinafter. It is to be recognized that the depicted configurations are meant to be illustrative in nature only, and related configurations may be used for practicing the various embodiments of the present disclosure in a like manner.

The structures contemplated for analysis by the embodiments described herein may contain two or more materials, one of which may serve as a reference material. According to at least some embodiments of the present disclosure, one of the materials is a deformable material and at least one of the materials is a substantially non-deformable material, or at least a material that is significantly less deformable than is the deformable material. Particular examples of each type of material are described hereinbelow. For convenience in the description that follows, the two or more materials will be referred to as a deformable material and a reference material, but it is to be recognized that an amount of either material may be measured and correlated to a mechanical quantity according to the embodiments of the present disclosure.

Figure 5A:
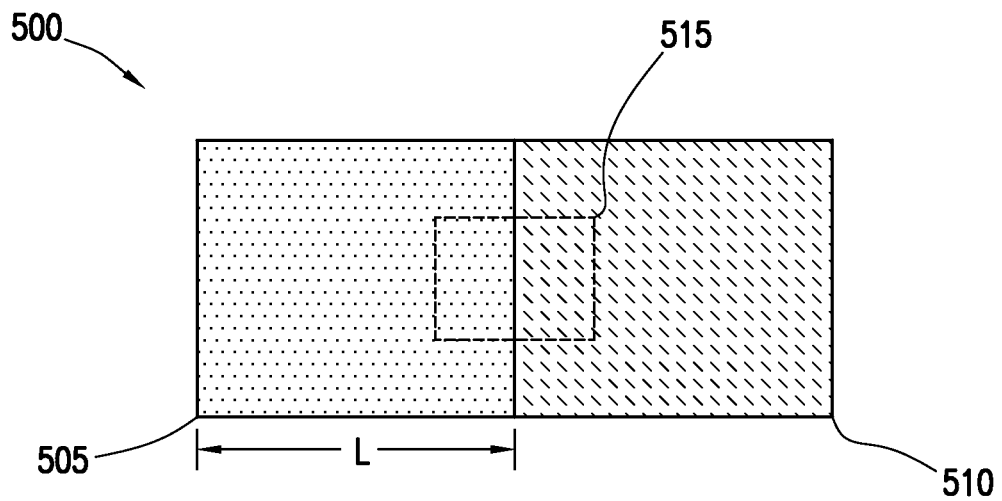
FIGS. 5A-5D show schematics of illustrative structures having a deformable material and a reference material arranged in one or more alternating layers.
Figure 5B:
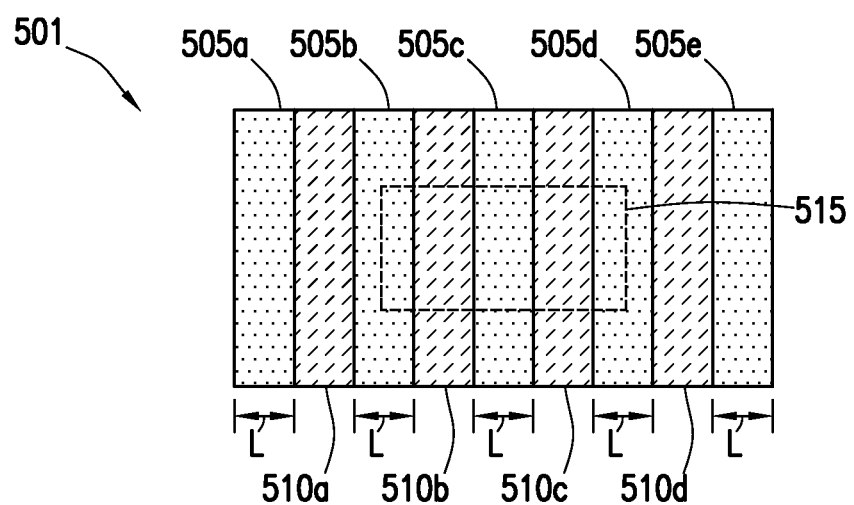

FIGS. 5A and 5B show schematics of illustrative structures 500 and 501 having a deformable material and a reference material arranged in one or more alternating layers. The one or more layers define one or more sub-areas comprising the deformable material or the reference material within a target area of the structure. As depicted in FIG. 5A, as little as one layer of deformable material 505 and one layer of reference material 510 may be present in structure 500. Similarly, as depicted in FIG. 5B, a plurality of alternating layers may be present in structure 501, specifically layers 505a-505e comprising a deformable material and layers 510a-510d comprising a reference material. It is to be recognized that the number, configuration and/or spacing of the layers in FIGS. 5A and 5B is for purposes of illustration only and should not be considered limiting.

With continued reference to FIGS. 5A and 5B, target area 515 is also present on the surface of structures 500 and 501, which represents a region where electromagnetic radiation optically interacts with structures 500 or 501 before or after optically interacting with one or more integrated computational elements (not depicted). An integrated computational element has not been depicted in the top view configurations of FIG. 5A or 5B in the interest of clarity, since the integrated computational element lies above or below the plane of the page. The location of an integrated computational element proximate to the structure may be better understood with reference to FIGS. 7 and 8, which show side view schematics of structures similar to that depicted in FIG. 5B. Further description of FIGS. 7 and 8 follows hereinbelow.

The configurations depicted in FIGS. 5A and 5B may represent the state of structures 500 and 501 in their normal or non-deformed condition. In this state, the quantity of deformable material 505, reference material 510, or both may be determined within target area 515. If structures 500 or 501 undergo deformation via compression or elongation, the amount of either material within target area 515 may be altered, as described below. In a similar manner, a shearing force inducing a torque in structures 500 or 501 may also alter the amounts of one or both materials present within target area 515.

Figure 5C:
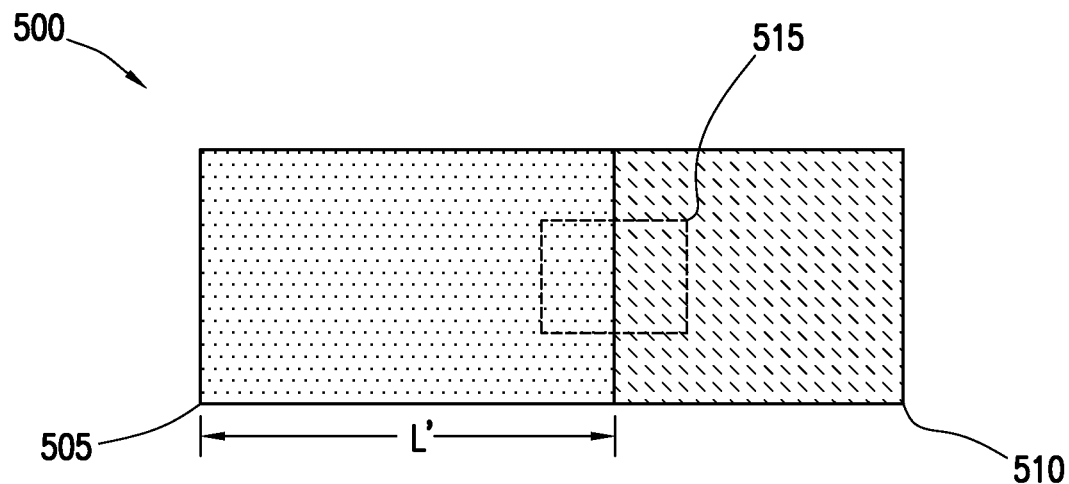
Figure 5D:
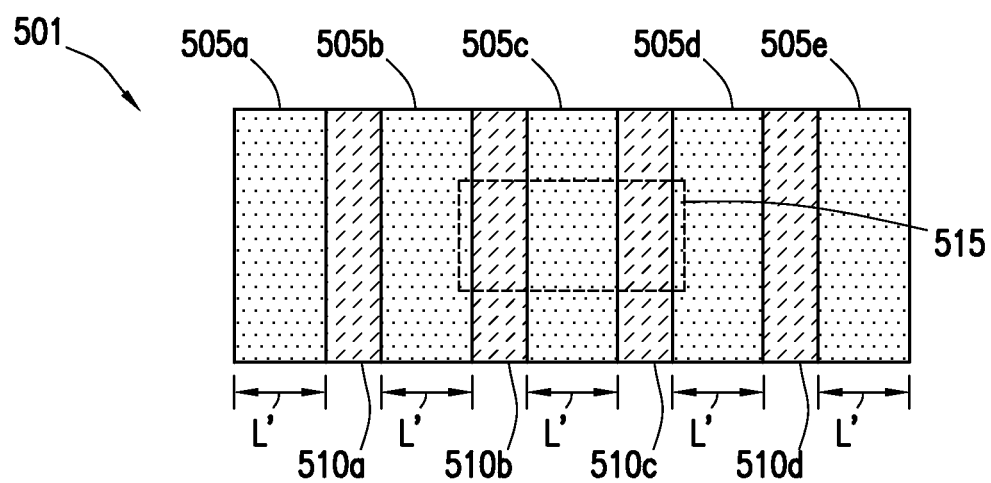

FIGS. 5C and 5D, respectively, show illustrative schematics of structures 500 and 501 after elongation has taken place in the presence of a deformation force. As depicted in FIGS. 5A-5D, deformable material 505 undergoes elongation from length L to L' when a deformation force is present, but reference material 510, which may be substantially non-deformable, remains unchanged in length. Although FIGS. 5C and 5D have depicted elongation within structures 500 and 501, it is to be recognized that related considerations to those presented below may be drawn when a compressive force is present.

Referring to FIG. 5C, it can be seen that a smaller fraction of deformable material 505 is present within target area 515, as measured by transmission, when the length is extended from L to L'. In a reflectance measurement of the surface within the configuration of FIG. 5C, the amount of deformable material 505 measured within target area 515 would remain substantially unchanged. Accordingly, the amount of deformable material 505 measured within target area 515 by transmission using the integrated computational element decreases when a deformation force induces elongation within structure 500. Conversely, the amount of deformable material 505 increases within target area 515 in the presence of a compressive force (not depicted). In contrast, the amount of reference material 510 within target area 515 remains the same in the presence of either type of deformation force, as measured by both transmission and reflection. The change in amount of deformable material 505 may be correlated to a mechanical quantity associated with the deformation force.

Similarly, as depicted in FIG. 5D, the amount of the deformable material within target area 515 decreases, as measured by transmission, in the presence of a deformation force that elongates structure 501, whereas the amount of the reference material remains the same. Specifically, as depicted in FIG. 5D, target area 515 contains a smaller amount of deformable material, since less of layers 505*b* and 505*d* remain within target area 515 after deformation takes place. In contrast, the entirety of layers 510*b* and 510*c* remain in target area 515 as depicted in both FIGS. 5B and 5D. However, depending upon the degree of elongation that takes place, target area 515 may contain lesser amounts of both the deformable material and the reference material, or only one of the materials may be present with target area 515. Again, related conclusions can be drawn when a compressive force decreases the size of structure 501. In contrast to the transmission measurements described above, the amount of the deformable material within target area 515, as measured using reflection, may increase or decrease in the depicted configuration of FIG. 5D depending on the amount of deformation and how the various layers are situated within target area 515 following deformation.

In regard to the above, it should be noted that in the embodiments described herein, target area 515 is fixed in its size and position relative to the integrated computational element(s) when assaying the normal state and a deformed state of a structure, but it may be sized as needed to accommodate both the deformable material and the reference material in either state. For example, target area 515 may be sized to accommodate the extent of deformation anticipated to take place. Accordingly, although target area 515 contains the same amount of the reference material as depicted in both FIGS. 5B and 5D (i.e., the entirety of layers 510*b* and 510*c*), it need not necessarily do so. Hence, in some embodiments, the amount of both the deformable material and the reference material within target area 515 may change in the presence of a deformation force. The change in amount of either material may then be correlated to a mechanical quantity producing the deformation according to the embodiments described herein.

Figure 6A:
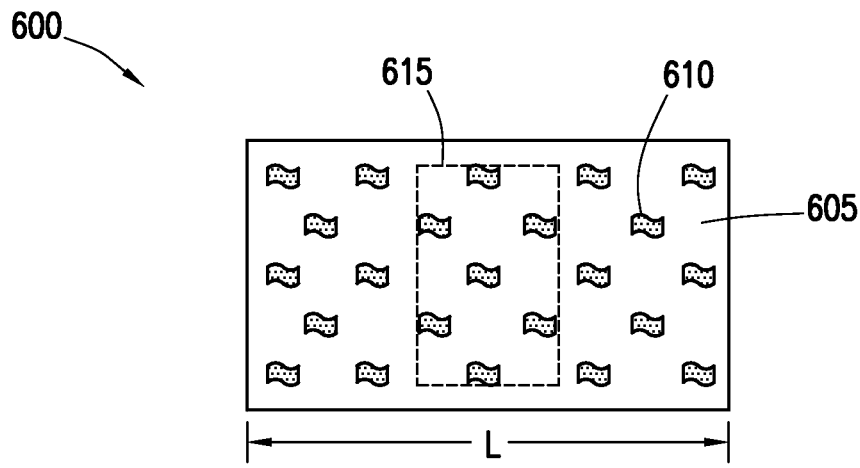
FIGS. 6A and 6B show schematics of an illustrative structure having a reference material distributed in a deformable material, both before and after deformation of the structure takes place.
Figure 6B:
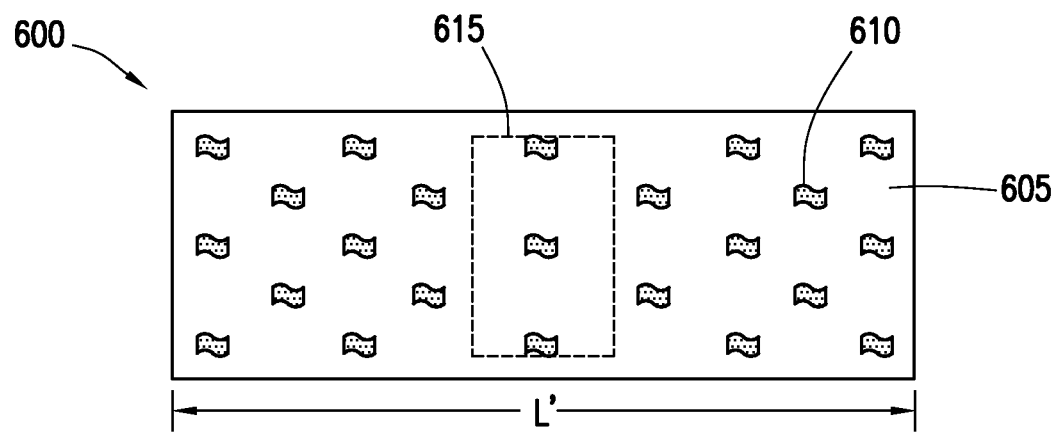

Although FIGS. 5A-5D have depicted various structural configurations in which a deformable material and a reference material are present in alternating layers, other configurations allowing like analyses to take place are also possible. In some embodiments, a structure may comprise a reference material that is distributed in a deformable material, as depicted in FIGS. 6A and 6B. In a like manner to that described above, determining a change in the amount of the reference material within the target area can allow a mechanical quantity associated with a deformation force to be determined, either by transmission or reflection. In some embodiments, the distribution of the reference material within the deformable material may comprise a substantially uniform distribution, since a uniform distribution may allow changes in the amount of the reference material to be more easily correlated with a mechanical quantity. However, in certain configurations, a non-uniform distribution may be desirable, such as when the reference material serves another purpose within a structure (e.g., as a structural reinforcement providing differential reinforcement to some parts of a structure more than others). Although the correlation function may be more complex when a non-uniform distribution of the reference material is present, as long as the original distribution pattern and the extent of deformation is known, correlation to a mechanical property may still take place.

FIGS. 6A and 6B show schematics of an illustrative structure having a reference material distributed in a deformable material, both before and after deformation of the structure takes place. As shown in FIG. 6A, structure 600 contains a plurality of particulates of reference material 610 distributed within a matrix of deformable material 605. In the non-deformed state of FIG. 6A, structure 600 has an initial length L and a set amount of reference material 610 located within target area 615 (i.e., 7 particulates as depicted in FIG. 6A). Upon undergoing elongation, as depicted in FIG. 6B, structure 600 now has a length of L', and the same amount of reference material 610 becomes distributed over a larger area. Specifically, the amount of reference material 610 present within target area 615 decreases from 7 particulates in FIG. 6A to only 3 particulates in FIG. 6B. The change in amount of reference material 610 within target area 615 can again be correlated with a mechanical quantity producing the deformation of structure 600. Similar conclusions can also be drawn when a compressive force is present (not depicted), in which case the amount of reference material 610 within target area 615 will increase, as discussed in more detail above. Discounting the area taken up by reference material 610, the amount of deformable material 605 within target area 615 will remain substantially constant, as measured by reflection, or decrease, as measured by transmission, when an elongation force is present.

Figure 7:
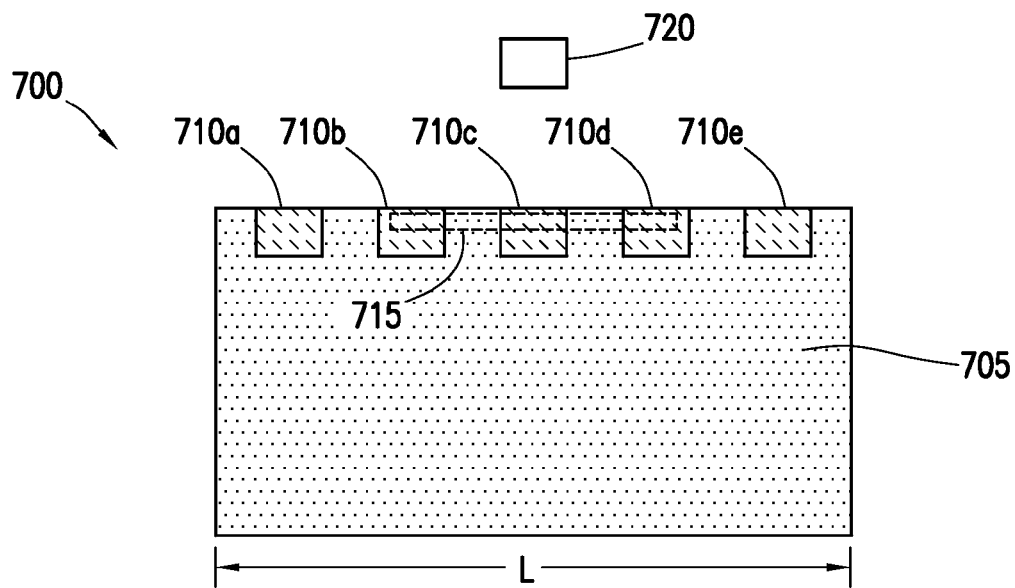
FIG. 7 shows an illustrative schematic of a layered structure in which layers of a reference material are only present near the surface of the layered structure in a matrix of a deformable material.

For both types of structures (i.e., those containing layers of the deformable material and the reference material, and those containing a reference material distributed in the deformable material), the reference material may, in some embodiments, only be present in an area of the structure being interrogated with electromagnetic radiation (i.e., a target area on the structure's surface). FIG. 7 shows an illustrative schematic of a layered structure in which layers or strips of a reference material are only present near the surface of the layered structure in a matrix of a deformable material. As depicted in the side view schematic of FIG. 7, layered structure 700 comprises matrix 705 of a deformable material and alternating layers 710a-e of a reference material that are spaced apart side-by-side relative to one another. Target area 715 is present near the top surface of layered structure 700, and integrated computational element 720 is disposed proximate to target area 715 so as to optically interrogate it. The change in amount of the reference material and its correlation to a mechanical property can be performed as generally described above. Reflection measurements may be particularly desirable when analyzing the configuration depicted in FIG. 7.

Figure 8:
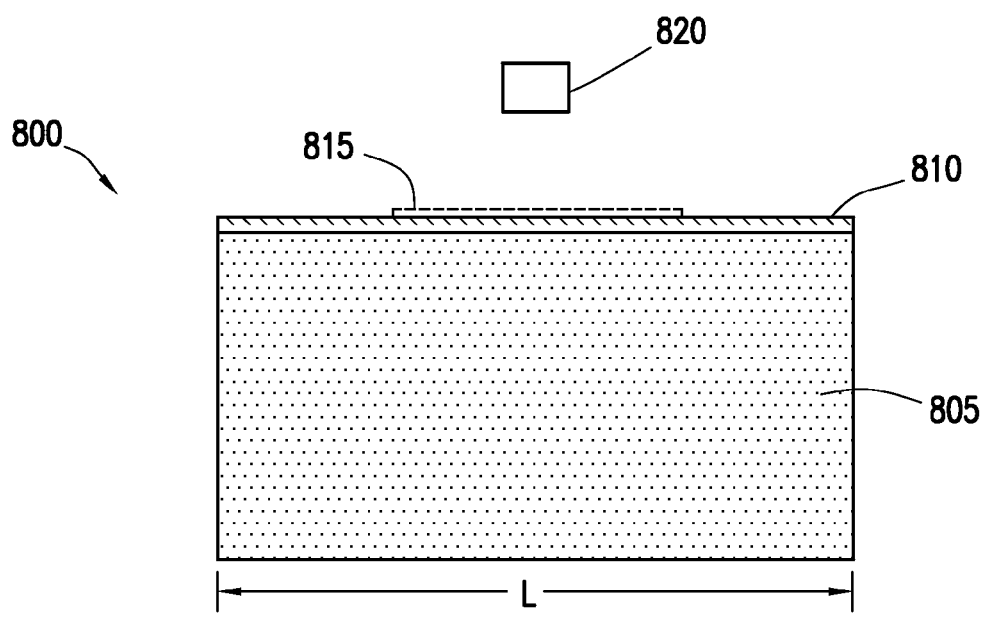
FIG. 8 shows an illustrative schematic of a structure containing a coating of a reference material on a deformable material.

Although FIG. 7 has depicted the reference material as being housed in a matrix of the deformable material, it is to be recognized that still further configurations also reside within the scope of the present disclosure. For example, in related embodiments, reference material may be applied as a coating on a deformable material. In some embodiments, the coating may comprise a discontinuous coating, and in other embodiments, the coating may be continuous on the surface of the structure. FIG. 8 shows an illustrative schematic of a structure containing a coating of a reference material on a deformable material. As depicted in the side view schematic of FIG. 8, structure 800 comprises matrix 805 of a deformable material and layer 810 of a reference material disposed thereon. Target area 815 is located on layer 810, and integrated computational element 820 is disposed proximate to target area 815 so as to optically interrogate it. In some embodiments, layer 810 may be applied as a paint or like thin film coating to matrix 805. In other embodiments, layer 810 may be adhered as an applique through the use of an adhesive. Again, reflection measurements may be particularly desirable in such embodiments.

In various embodiments, methods described herein may comprise: optically interacting electromagnetic radiation with one or more integrated computational elements and a target area of a structure, the structure comprising a deformable material in an initial amount and a reference material in an initial amount within the target area; exposing the structure to a deformation force; determining a change in amount of the deformable material or the reference material within the target area, using the one or more integrated computational elements; and correlating the change in amount of the deformable material or the reference material within the target area to a mechanical quantity associated with the deformation force.

In various embodiments, methods described herein may comprise: optically interacting electromagnetic radiation with one or more integrated computational elements and a target area of a structure, the structure comprising a deformable material and a reference material within the target area; determining an initial amount of the deformable material or the reference material within the target area, using the one or more integrated computational elements; after determining the initial amount of the deformable material or the reference material within the target area, allowing the structure to undergo deformation in the presence of a deformation force; after allowing the structure to undergo deformation, determining an amount of the deformable material or the reference material within the target area, using the one or more integrated computational elements; and correlating a change in amount of the deformable material or the reference material within the target area to a mechanical quantity associated with the deformation force.

In some embodiments, the methods may further comprise providing the electromagnetic radiation that optically interacts with the target area of the structure and the one or more integrated computational elements. In some embodiments, the electromagnetic radiation may be provided from an external source such as a lamp, a laser, a light-emitting diode (LED), a blackbody, or the like. The type of electromagnetic radiation that is optically interacted with the target area and the one or more integrated computational elements is not believed to be particularly limited. Suitable electromagnetic radiation sources may include visible light, infrared radiation, near-infrared radiation, ultraviolet radiation, X-ray radiation, gamma ray radiation, radio wave radiation, microwave radiation, any combination thereof, and the like. Particular types of electromagnetic radiation that optically interact strongly with a material in the target area may dictate the chosen type and specific wavelengths of electromagnetic radiation employed in the methods described herein.

In some embodiments, the electromagnetic radiation detected after optically interacting with the target area and the one or more integrated computational elements may lie in the near-infrared region of the electromagnetic spectrum. In some embodiments, the detected electromagnetic radiation may lie within a wavelength range of about 1000 nm to about 5000 nm, or a range of about 1000 nm to about 4000 nm, or a range of about 1000 nm to about 3000 nm. Other detected wavelength ranges are possible and can include, for example, detection in the radio wave region, the microwave radiation region, the infrared radiation region, the visible light region, the ultraviolet radiation region, the X-ray radiation region, the gamma ray radiation region, or any combination thereof. The particular detection region chosen will depend, at least in part, upon the nature of the optical interaction of the electromagnetic radiation with the materials that are present in the structure. Moreover, one of ordinary skill in the art will be able to choose a suitable detector for use in detecting a particular type of electromagnetic radiation.

In some embodiments, the methods described herein may further comprise detecting the electromagnetic radiation that has optically interacted with the target area and the one or more integrated computational elements, and generating an output signal based on the detected electromagnetic radiation, the output signal being correlatable to the change in amount of the deformable material or the reference material within the target area. Correlation of the change in the amount of the deformable material or the reference material to a mechanical quantity associated with a deformation force may then take place as generally described above.

In general, the origin of the deformation force present in the structure undergoing analysis is not believed to be particularly limited. In some embodiments, the deformation force may be induced from a condition or source external to the structure. In illustrative embodiments, external conditions that may produce a deformation force in a structure include, but are not limited to, an applied load, pressure, temperature, and the like. In other embodiments, the deformation force may be induced internally from within a structure. For example, chemical or physical degradation of a component within a structure may induce a deformation force therein. Chemical reactions within the structure may also function similarly. Internal stress may also produce a deformation force within a structure.

Regardless of the origin of the deformation force within a structure, various mechanical quantities associated with the deformation force may be determined according to the embodiments described herein. Specifically, the change in amount of the deformable material or the reference material within a target area of the structure may be correlated with one or more mechanical quantities associated with the deformation force. Illustrative mechanical quantities or conditions that may be quantified according to the embodiments described herein include, but are not limited to, strain, stress, expansion and contraction (e.g., thermal expansion and contraction), pressure, and any combination thereof. In some embodiments, exposing a structure to a deformation force may comprise applying a load to the structure or applying pressure to the structure. Generally, any mechanical quantity or condition associated with producing a displacement within the structure may be determined according to the embodiments described herein. For example, in some embodiments, the methods described herein may be extended to measure the amount of vibration being experienced by a structure. Further disclosure below describes how the change in amount of the deformable material or the reference material in the target area may be correlated with various mechanical quantities.

Generally, the ratio of the deformable material to the reference material, or vice versa depending upon which one is analyzed, is proportional to the displacement that occurs in a structure due to a deformation force. Knowing a ratio of these materials, one may then determine the change in amount of either material, or both materials, and correlate this change to a mechanical quantity associated with a displacement force. For example, the amount of either material may be compared to known values of a mechanical quantity in the structure through calibration function techniques. The correlation between the amount of either material to the mechanical quantity may represent a linear relationship. For example, in the case of the reference material being analyzed, the ratio of the amount of the reference material to the deformable material may be expressed by the proportionality ratio of Formula 1, wherein [RM] is the amount of the reference material, [DM] is the amount of the deformable material, L is the initial length of a structure, and $\Delta L$ is the change in length of the structure as a result of its exposure to a deformation force.

$$[RM]/[DM] \alpha L_0/(\Delta L + L_0) \qquad \text{(Formula 1)}$$

In the event that the deformable material is being analyzed, the ratio [DM]/[RM] is proportional to $L_0/(\Delta L + L_0)$. Formula 1 may be written with an equal sign by multiplying the quantity [RM]/[DM] by an appropriate proportionality constant, K. More generally, the relationship of the various quantities may be expressed as in Formula 2, where f(RM, DM) is a function of the amount of reference material and the amount of deformable material that are being analyzed by the integrated computational element.

$$K^*f(RM,DM) = L_0/(\Delta L + L_0) \qquad \text{(Formula 2)}$$

Strain may be calculated using Formula 3 in which the quantities $L_0$ and L are defined as above.

$$\text{Strain} = (\Delta L + L_0)/L_0$$

As described above, the change in amount of either the deformable material or the reference material in the target area of a structure may be determined and correlated to a mechanical quantity according to the embodiments described herein. In some embodiments, a change in amount of the reference material may be determined, and the change in its amount may be correlated to the mechanical quantity. In other embodiments, a change in amount of the deformable material may be determined, and the change in its amount may be correlated to the mechanical quantity. In still other embodiments, a change in amount of both materials may be determined, and the changes may be correlated to the mechanical quantity. The configuration of the structure, the amount of deformation, and/or the identity of each material may determine, at least in part, which material is more advantageous to analyze according to the embodiments described herein. Moreover, depending on the configuration of the structure and its opacity, for example, the analysis of either material may be made by transmission or reflection.

In the embodiments described herein, a structure being analyzed using an integrated computational element may comprise a deformable material and reference material arranged in a known fashion with respect to the deformable material. For example, in some embodiments, the reference material may be layered within the deformable material or uniformly distributed in the deformable material. In some embodiments, the reference material may only be present within a portion of the structure, such as on or near the surface of the structure, where it can be optically interrogated using an integrated computational element. In some embodiments, the reference material may be present only on a surface of the structure, where it may comprise a layer or thin film coating in some embodiments. In some embodiments, a reference material on a surface of the structure may comprise a continuous layer or thin film coating, and in other embodiments, the layer or thin film coating may be discontinuous. In either case, a change in the amount of the reference material may be determined and correlated to a mechanical quantity according to the embodiments described herein.

In some embodiments, the reference material may be present only within the target area of a structure. For example, in a large structure, a reference material may be applied to several locations on its exterior, and target areas of a desired size may be analyzed about the reference material at each location, thereby allowing a map of the displacement forces to be determined within the structure. Mapping of displacement forces is described in more detail below.

Suitable deformable materials and reference materials for use in the embodiments described herein are not believed to be particularly limited, given the wide range of materials that can be detected using integrated computational elements. In general, the reference material may be less deformable than is the deformable material under the influence of the deformation force, such that the deformation force deforms the deformable material to a greater extent than it does the reference material. In some embodiments, the reference material may be substantially non-deformable when exposed to the deformation force.

The deformable material may be an elastically deformable material in some embodiments. As used herein, the term "elastically deformable" refers to a material that returns to substantially its original shape when a deformation force is removed therefrom. Illustrative elastically deformable materials may include, for example, rubbers, silicones, and certain other types of elastomeric polymers. Other illustrative deformable materials may include, for example, polyisoprene, polybutadiene, polychloroprene, and copolymers thereof, as well as co-polymers including styrene-butadiene, ethylene-propylene, butadiene-acrylonitrile, and other co-polymers. In some or other embodiments, the deformable material may comprise a composite. When analyzing a structure containing an elastically deformable material, the target area of the structure is interrogated with electromagnetic radiation while a deformation force is being applied thereto, since the structure may no longer be displaced or deformed once the deformation force is no longer present.

In other embodiments, the deformable material may be an inelastically deformable material. As used herein, the term "inelastically deformable" refers to a material that does not completely return to substantially its original shape when a deformation force is removed therefrom, although it may return partially. In some embodiments, a structure containing an inelastically deformable material may be interrogated with electromagnetic radiation while the deformation force is being applied thereto, much like a structure containing an elastically deformable material. However, unlike a structure containing an elastically deformable material, useful information may still be gained by interrogating the structure even after a deformation force is removed therefrom. For example, it may be possible if a structure has been permanently deformed to such an extent that it is no longer suitable for its intended purpose. It is again to be emphasized that as long as a reference material can be suitably measured using an integrated computational element, any type of material may be assayed according to the embodiments described herein.

In some embodiments, the reference material may comprise an inorganic material. Suitable reference materials may include substances such as glass, minerals, metals, and the like.

In some embodiments, one target area within a structure may be analyzed using an integrated computational element in order to determine a mechanical quantity associated with a deformation force being experienced by the structure. In many instances, the interrogation of one target area within a structure may be sufficient to determine the effect a deformation force has had upon the structure. In other embodiments, it may be desirable to assay multiple target areas of the structure, since certain areas of a structure may be more susceptible to unwanted deformation effects than are others, or deformation may occur in only a particular dimension of the structure. When more than one target area is being assayed according to the embodiments described herein, a map of the deformation force and its associated mechanical quantities may be produced for the structure. For example, in some embodiments, target areas of a structure that are not coplanar with one another may be assayed according to some of the present embodiments. That is, a three-dimensional map of the deformation force within a structure and its associated mechanical quantities may be determined according to some of the present embodiments.

The one or more integrated computational elements used for analyzing the target area(s) within a structure can be fixed in place relative to the structure, or they can be movable, such that multiple target areas can be assayed by a particular group of integrated computational elements. That is, when movable integrated computational elements are present, electromagnetic radiation may be received from multiple target areas but analyzed by the same integrated computational element(s). In other embodiments, each target area within a structure may have one or more integrated computational elements associated therewith so that each target area may be analyzed individually by its own set of integrated computational elements. For example, in some embodiments, the integrated computational elements may be fixed in an array located proximate to the various target areas. In some embodiments, the array may comprise a three-dimensional array such that electromagnetic radiation can be received from multiple target areas of a structure that are not substantially coplanar with one another.

As described above, integrated computational elements may be used to provide a non-contact method of sensing a mechanical quantity within a structure. A wide range of fields are believed to be applicable to use of the sensing techniques described herein. Illustrative but non-limiting fields in which a structure subject to potential failure may be assayed according to the embodiments described herein include, for example, the automotive and aerospace industries. Clothing, biological membranes, chemical tattoos, inflammation and swelling, and patient positioning may also be assayed in a similar manner. Likewise, fragile foodstuffs, agricultural materials, and other fragile materials may be monitored during their transportation and manufacturing. Any of these analyses may be conducted while the structure is deployed in its end use configuration, thereby providing access to real-time quality control information.

In various embodiments, the present disclosure provides sensors based upon optical interaction of electromagnetic radiation with one or more integrated computational elements. In some embodiments, the sensors may comprise: a structure comprising a deformable material and a reference material within a target area; one or more integrated computational elements located proximate to the target area; and a detector configured to receive electromagnetic radiation that has optically interacted with the target area and the one or more integrated computational elements.

The sensors may be configured to detect a mechanical quantity being experienced by the structure, as described in greater detail above. In various embodiments, the sensors may be configured as a strain sensor, a stress sensor, a pressure sensor, a temperature sensor, or any combination thereof. In each case, displacement produced in the structure of the sensor by a deformation force may provide the means upon which detection is based. A pressure sensor, for example, may resemble optical computing device 200 depicted in FIG. 2, except sampling window 216 may be replaced by any embodiment of the structures described hereinabove. Thus, electromagnetic radiation optically interacting with the structure may allow a displacement therein to be determined, which can be subsequently correlated to the fluid pressure behind the structure (e.g., within flow path 204). Similarly configured sensors may be envisioned for other types of sensing environments.

Embodiments disclosed herein include:

A. Methods for determining a mechanical quantity being experienced by a structure. The methods comprise: optically interacting electromagnetic radiation with one or more integrated computational elements and a target area of a structure, the structure comprising a deformable material in an initial amount and a reference material in an initial amount within the target area; exposing the structure to a deformation force; determining a change in amount of the deformable material or the reference material within the target area, using the one or more integrated computational elements; and correlating the change in amount of the deformable material or the reference material within the target area to a mechanical quantity associated with the deformation force.

B. Methods for determining a mechanical quantity being experienced by a structure. The methods comprise: optically interacting electromagnetic radiation with one or more integrated computational elements and a target area of a structure, the structure comprising a deformable material and a reference material within the target area; determining an initial amount of the deformable material or the reference material within the target area, using the one or more integrated computational elements; after determining the initial amount of the deformable material or the reference material within the target area, allowing the structure to undergo deformation in the presence of a deformation force; after allowing the structure to undergo deformation, determining an amount of the deformable material or the reference material within the target area, using the one or more integrated computational elements; and correlating a change in amount of the deformable material or the reference material within the target area to a mechanical quantity associated with the deformation force.

C. Sensors for determining a mechanical quantity. The sensors comprise: a structure comprising a deformable material and a reference material within a target area; one or more integrated computational elements located proximate to the target area; and a detector configured to receive electromagnetic radiation that has optically interacted with the target area and the one or more integrated computational elements.

Each of embodiments A, B and C may have one or more of the following additional elements in any combination:

Element 1: wherein the mechanical quantity comprises a condition selected from the group consisting of strain, stress, thermal expansion, thermal contraction, pressure, and any combination thereof.

Element 2: wherein exposing the structure to a deformation force comprises applying a load to the structure or applying pressure to the structure.

Element 3: wherein the deformable material comprises an elastically deformable material.

Element 4: wherein the deformable material comprises an inelastically deformable material.

Element 5: wherein the reference material is substantially non-deformable when exposed to the deformation force.

Element 6: wherein the reference material is present only on a surface of the structure.

Element 7: wherein the reference material is present only within the target area of the structure.

Element 8: wherein the reference material comprises a thin film coating on a surface of the structure.

Element 9: wherein a change in amount of the deformable material is determined, and the change in its amount is correlated to the mechanical quantity.

Element 10: wherein a change in amount of the reference material is determined, and the change in its amount is correlated to the mechanical quantity.

Element 11: wherein the one or more integrated computational elements are configured to be movable relative to the structure, such that electromagnetic radiation is received from multiple target areas of the structure by the one or more integrated computational elements.

Element 12: wherein the one or more integrated computational elements are arranged in a fixed array, such that electromagnetic radiation is received from multiple target areas of the structure by one or more integrated computational elements located proximate to each target area.

Element 13: wherein the deformable material and the reference material are arranged in alternating layers within the target area.

Element 14: wherein the reference material comprises particulates that are distributed in the deformable material.

Element 15: wherein the change in amount of the deformable material or the reference material within the target area is determined while the structure is being exposed to the deformation force.

Element 16: wherein the method further comprises: detecting the electromagnetic radiation that has optically interacted with the target area and the one or more integrated computational elements; and generating an output signal based on the detected electromagnetic radiation, the output signal being correlatable to the change in amount of the deformable material or the reference material within the target area.

Element 17: wherein a change in amount of the deformable material, the reference material, or both the deformable material and the reference material is determined, and the change in amount of either or both materials is correlated to the mechanical quantity.

By way of non-limiting example, exemplary combinations applicable to A and B include:

The method of A or B in combination with elements 1 and 2.

The method of A or B in combination with elements 3 and 5.

The method of A or B in combination with elements 1, 3 and 5.

The method of A or B in combination with elements 2 and 10.

The method of A or B in combination with elements 3, 5 and 11.

The method of A or B in combination with elements 3 and 13.

The method of A or B in combination with elements 3 and 15.

The method of A or B in combination with elements 3, 15 and 16.

Exemplary combinations applicable to C include:

The sensor of C in combination with elements 3 and 5.

The sensor of C in combination with elements 3 and 13.

The sensor of C in combination with elements 3 and 14.

To facilitate a better understanding of the embodiments of the present disclosure, the following examples of preferred or representative embodiments are given. In no way should the following examples be read to limit, or to define, the scope of the disclosure.

EXAMPLES

Prophetic Example 1

Figure 9A:
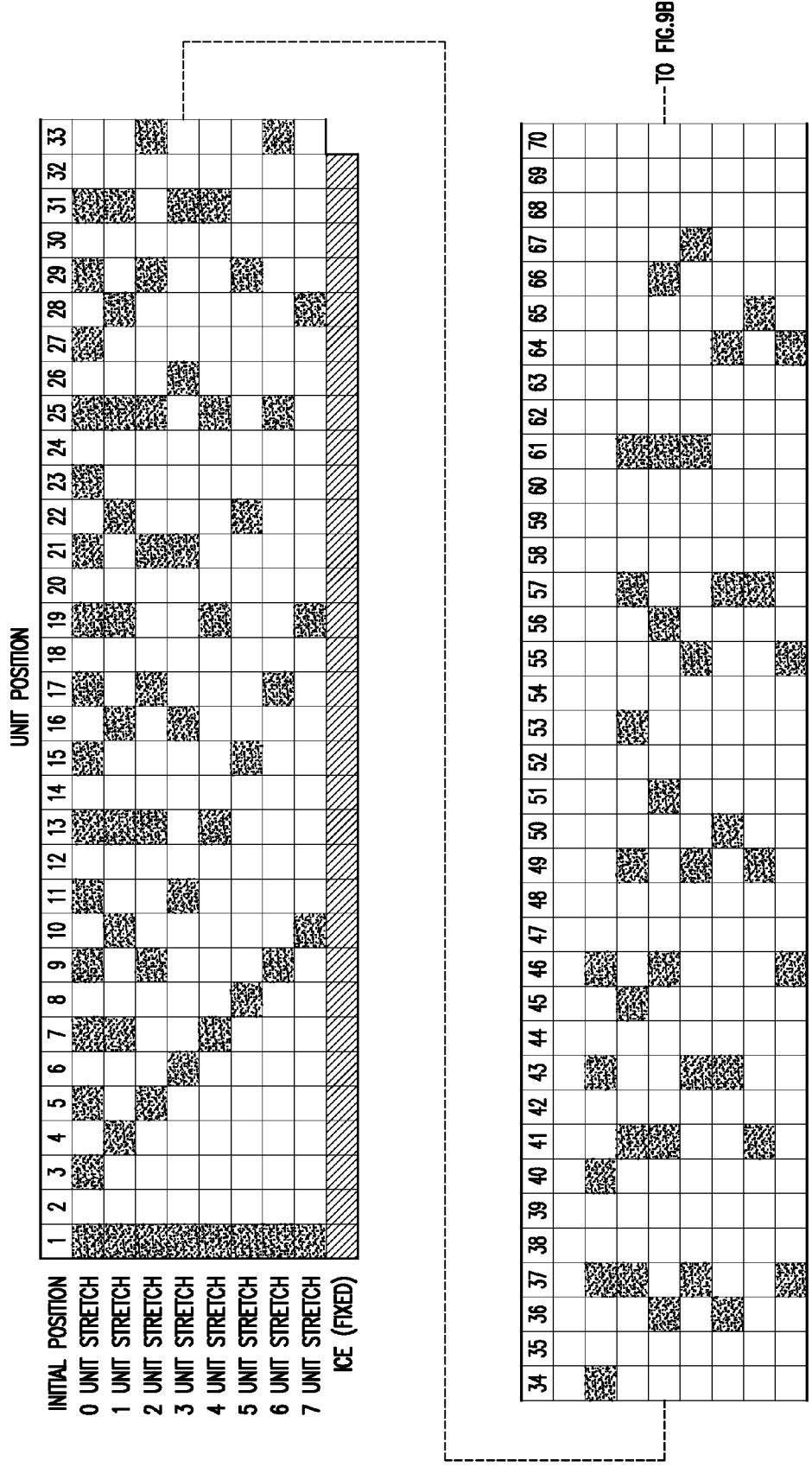
FIGS. 9A and 9B show a schematic of an exemplary linear structure containing 16 units of a deformable material alternating with 16 units of a reference material and how the reference material becomes disposed as the deformable material is stretched.
Figure 9B:
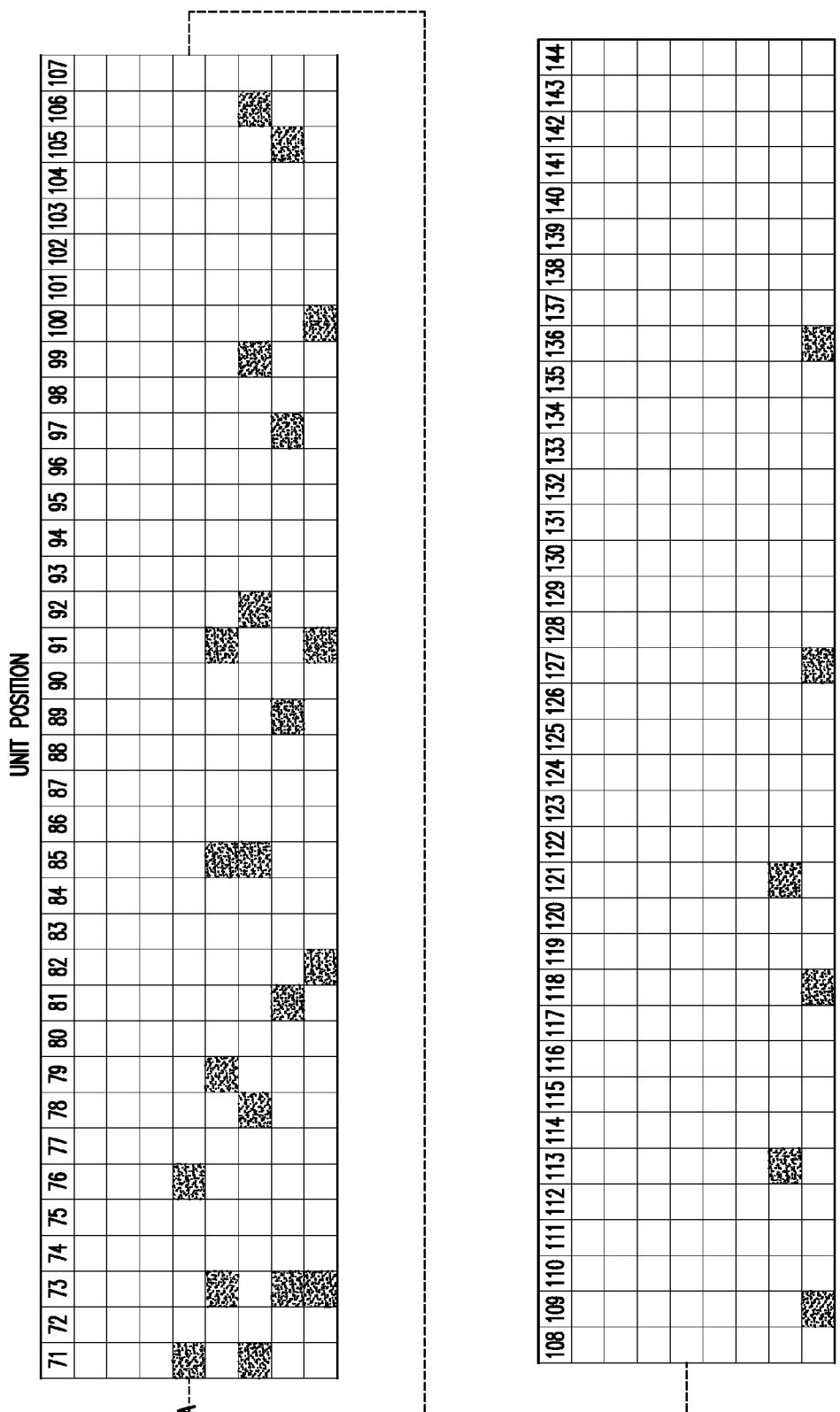

The following prophetic example demonstrates how a linear structure containing an alternating, regular distribution of a deformable material and a reference material may be used to develop a strain sensor using an integrated computational element. For purposes of illustration within this example, the linear structure is considered to consist of 16 equal units of a deformable material alternating with 16 equal units of a reference material. FIGS. 9A and 9B show a schematic of a linear structure containing 16 units of a deformable material alternating with 16 units of a reference material and how the reference material becomes disposed as the deformable material is stretched. At each stretching iteration, each unit of the deformable material doubles in width, while each unit of the reference material remains unchanged in width but moves as elongation of the deformable material occurs. Before deformation occurs, the linear structure is 32 units in width, and an integrated computational element remains focused on analyzing those 32 units at all times (i.e., the integrated computational element is configured to analyze a fixed position). The position of the integrated computational element over the fixed 32 units is also indicated in FIGS. 9A and 9B.

Figure 10:
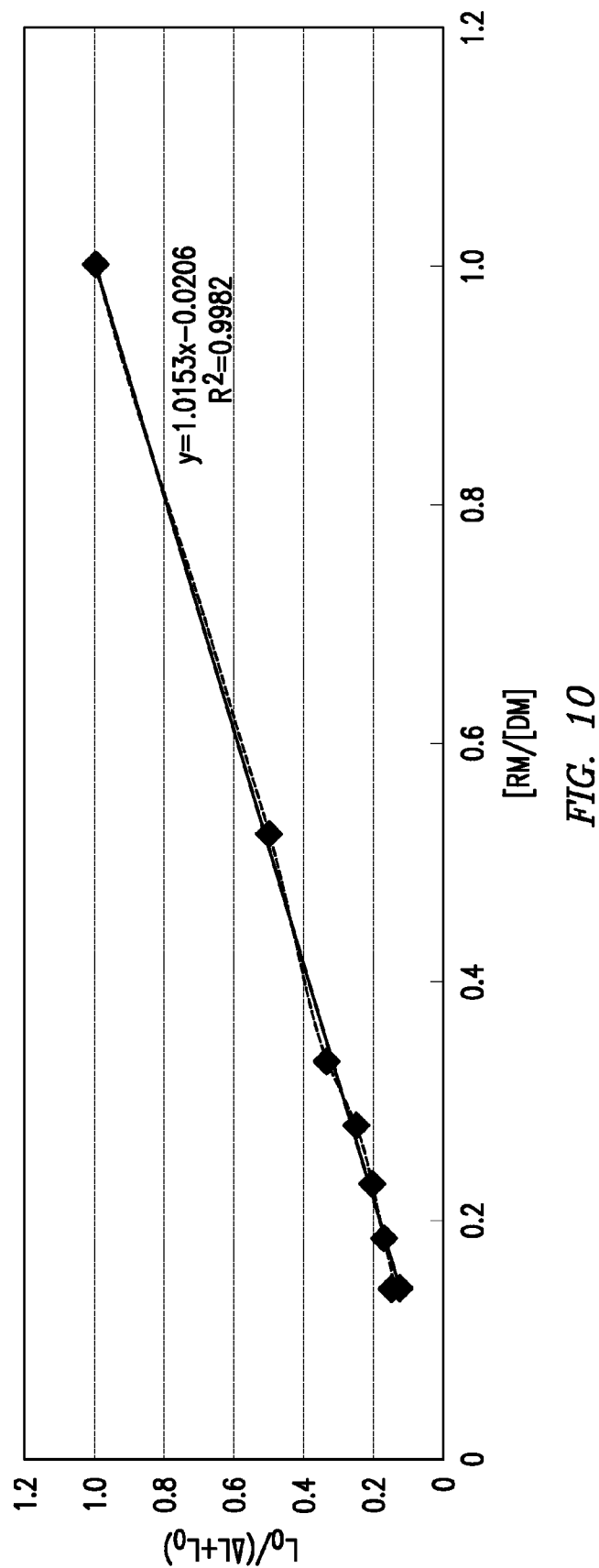
FIGS. 10-13 show illustrative plots of the values of the deformable material, the reference material and the change in length of the exemplary linear structure of FIGS. 9A and 9B, as measured using reflectance.
Figure 11:
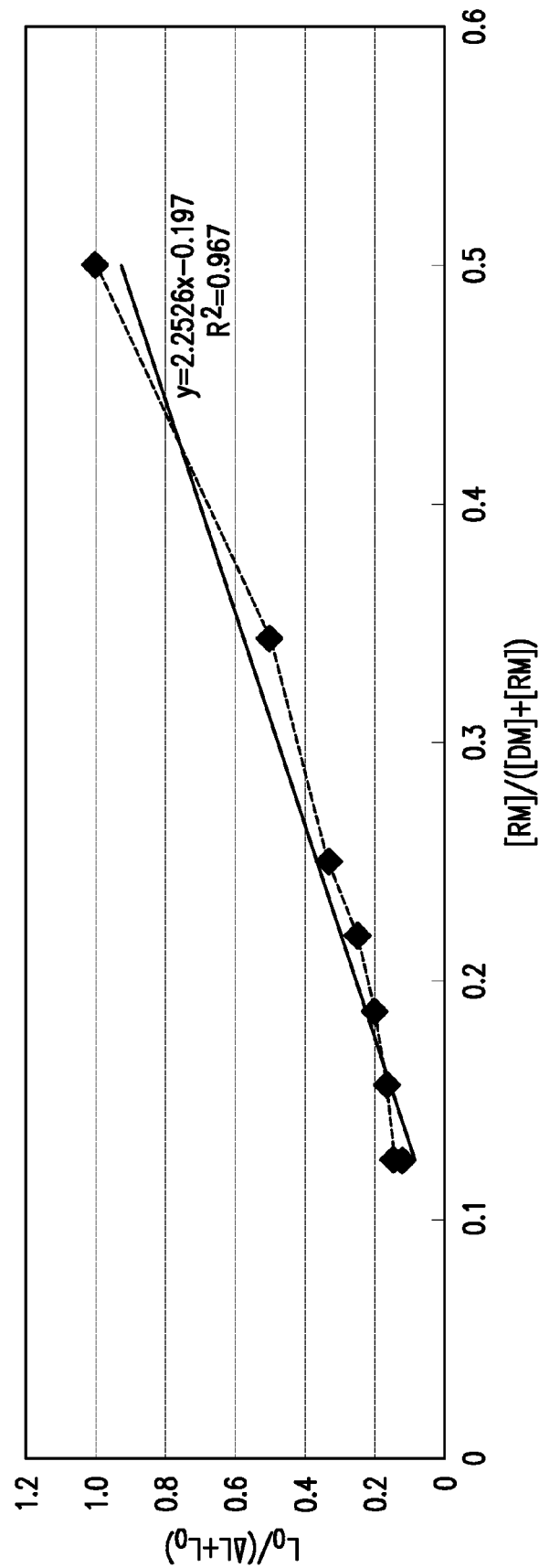
Figure 12:
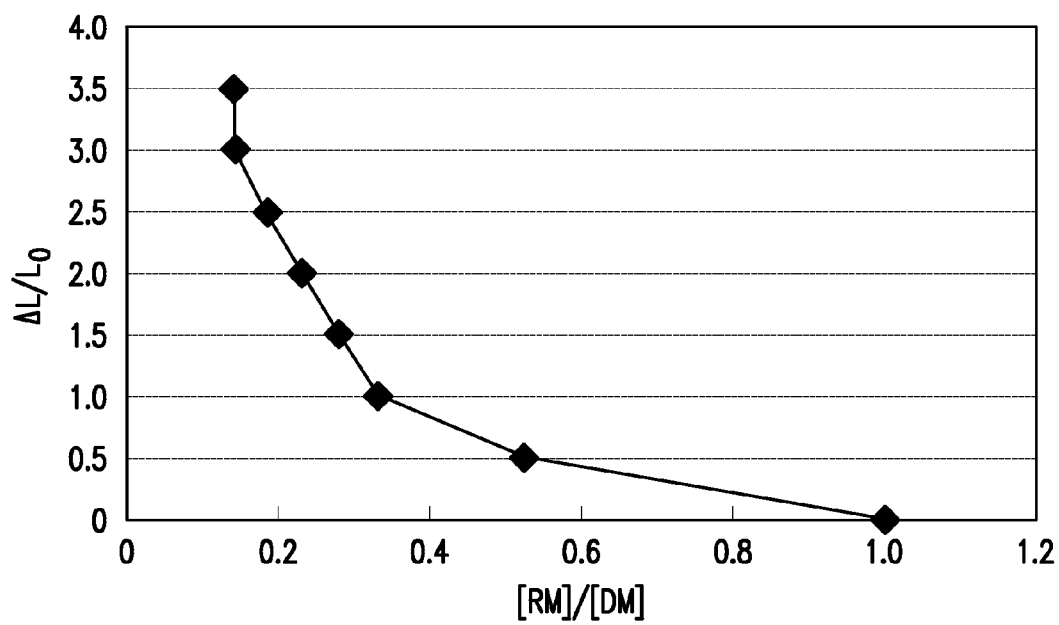
Figure 13:
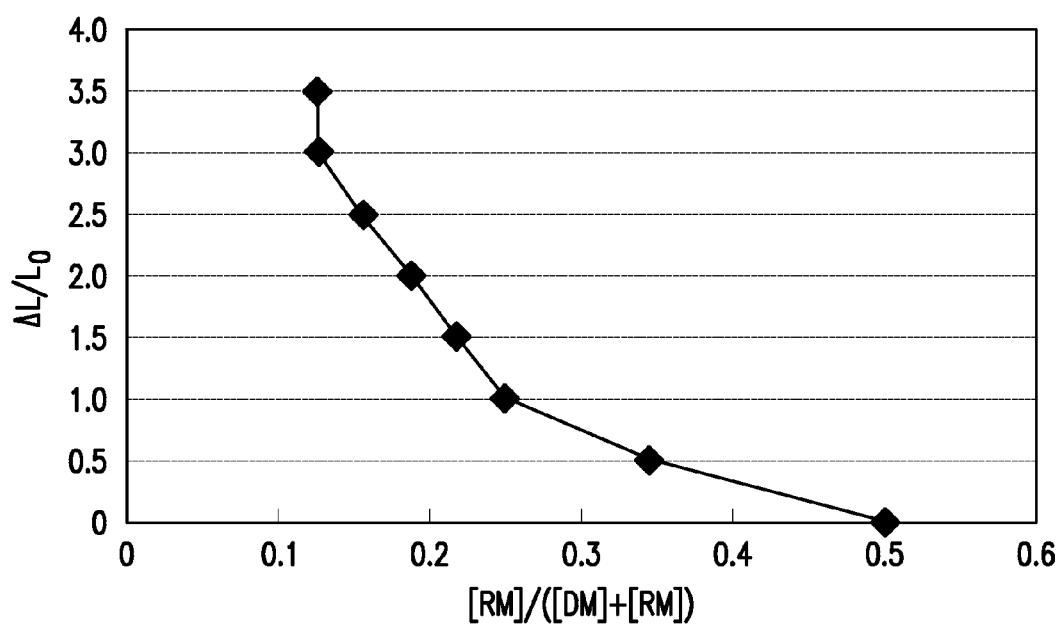

Considering each "cell" of FIGS. 9A and 9B to have a value of unity, Table 1 shows relative values for the deformable material, the reference material, and the change in length of the linear structure, as measured by reflection. From the values in Table 1, various calibration plots can be obtained, as exemplified in FIGS. 10-13. As shown in FIGS. 10 and 11, although the relationship $L_0/(\Delta L+L_0)$ is non-linear, it can be fit reasonably well through a linear regression protocol. FIGS. 12 and 13 show plots of the corresponding strain against the x-axis quantities of FIGS. 10 and 11, thereby implying that the strain may be calculated and calibrated by fitting to the regression function of the former FIGURES.

TABLE 1

| [RM] | [DM] | [RM]/[DM] | [RM]/([RM] + [DM]) | $\Delta L$ | $\Delta L + L_0$ | $L_0/(\Delta L + L_0)$ | $\Delta L/L_0$ |
|---|---|---|---|---|---|---|---|
| 16 | 16 | 1.00 | 0.50 | 0 | 32 | 1.00 | 0.0 |
| 11 | 21 | 0.52 | 0.34 | 16 | 48 | 0.50 | 0.5 |
| 8 | 24 | 0.33 | 0.25 | 32 | 64 | 0.33 | 1.0 |
| 7 | 25 | 0.28 | 0.22 | 48 | 80 | 0.25 | 1.5 |
| 6 | 26 | 0.23 | 0.19 | 64 | 96 | 0.20 | 2.0 |

TABLE 1-continued

| [RM] | [DM] | [RM]/[DM] | [RM]/([RM] + [DM]) | ΔL | ΔL + L$_0$ | L$_0$/(ΔL + L$_0$) | ΔL/L$_0$ |
|---|---|---|---|---|---|---|---|
| 5 | 27 | 0.19 | 0.16 | 80 | 112 | 0.17 | 2.5 |
| 4 | 28 | 0.14 | 0.13 | 96 | 128 | 0.14 | 3.0 |
| 4 | 28 | 0.14 | 0.13 | 112 | 144 | 0.13 | 3.5 |

Prophetic Example 2

The analyses presented in Prophetic Example 1 above may also be extended to transmission measurements using similar considerations. Table 2 summarizes the relative values for the deformable material, the reference material, and the change in length of the linear structure of FIG. 9, as measured by transmission. In this case, the total amount of the reference material measured by the integrated computational element may be matched to a known strain in the system and subsequently correlated for measuring an unknown strain at a later time.

TABLE 2

| [RM] | [DM] | [RM]/[DM] | [RM]/([RM] + [DM]) | ΔL | ΔL + L$_0$ | L$_0$/(ΔL + L$_0$) | ΔL/L$_0$ |
|---|---|---|---|---|---|---|---|
| 16 | 16 | 1.00 | 0.50 | 0 | 32 | 1.00 | 0.0 |
| 11 | 10.5 | 1.05 | 0.51 | 16 | 48 | 0.50 | 0.5 |
| 8 | 8 | 1 | 0.5 | 32 | 64 | 0.33 | 1.0 |
| 7 | 6.25 | 1.12 | 0.53 | 48 | 80 | 0.25 | 1.5 |
| 6 | 5.2 | 1.15 | 0.54 | 64 | 96 | 0.20 | 2.0 |
| 5 | 4.5 | 1.11 | 0.53 | 80 | 112 | 0.17 | 2.5 |
| 4 | 4 | 1 | 0.5 | 96 | 128 | 0.14 | 3.0 |
| 4 | 3.5 | 1.14 | 0.53 | 112 | 144 | 0.13 | 3.5 |

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained in a particular implementation of the present disclosure. At the very least, and not as an attempt to limit the application of the doctrine of equivalents to the scope of the claim, each numerical parameter should at least be construed in light of the number of reported significant digits and by applying ordinary rounding techniques.

What is claimed is the following:

1. A method comprising:
   optically interacting electromagnetic radiation with one or more integrated computational elements and a target area of a structure, the structure comprising a deformable material in an initial amount and a reference material in an initial amount within the target area;
   exposing the structure to a deformation force;
   determining a change in amount of the deformable material or the reference material within the target area, using the one or more integrated computational elements; and
   correlating the change in amount of the deformable material or the reference material within the target area to a mechanical quantity associated with the deformation force.

2. The method of claim 1, wherein the mechanical quantity comprises a condition selected from the group consisting of strain, stress, thermal expansion, thermal contraction, pressure, and any combination thereof.

3. The method of claim 1, wherein exposing the structure to a deformation force comprises applying a load to the structure or applying pressure to the structure.

4. The method of claim 1, wherein the deformable material comprises an elastically deformable material.

5. The method of claim 1, wherein the deformable material comprises an inelastically deformable material.

6. The method of claim 1, wherein the reference material is substantially non-deformable when exposed to the deformation force.

7. The method of claim 1, wherein the reference material is present only on a surface of the structure.

8. The method of claim 7, wherein the reference material is present only within the target area of the structure.

9. The method of claim 7, wherein the reference material comprises a thin film coating on a surface of the structure.

10. The method of claim 1, wherein a change in amount of the deformable material, the reference material, or both the deformable material and the reference material is determined, and the change in amount of either or both materials is correlated to the mechanical quantity.

11. The method of claim 1, wherein the one or more integrated computational elements are configured to be movable relative to the structure, such that electromagnetic radiation is received from multiple target areas of the structure by the one or more integrated computational elements.

12. The method of claim 1, wherein the one or more integrated computational elements are arranged in a fixed array, such that electromagnetic radiation is received from multiple target areas of the structure by one or more integrated computational elements located proximate to each target area.

13. The method of claim 1, wherein the deformable material and the reference material are arranged in alternating layers within the target area.

14. The method of claim 1, wherein the reference material comprises particulates that are distributed in the deformable material.

15. The method of claim 1, wherein the change in amount of the deformable material or the reference material within the target area is determined while the structure is being exposed to the deformation force.

16. The method of claim 1, further comprising:
detecting the electromagnetic radiation that has optically interacted with the target area and the one or more integrated computational elements; and
generating an output signal based on the detected electromagnetic radiation, the output signal being correlatable to the change in amount of the deformable material or the reference material within the target area.

17. A method comprising:
optically interacting electromagnetic radiation with one or more integrated computational elements and a target area of a structure, the structure comprising a deformable material and a reference material within the target area;
determining an initial amount of the deformable material or the reference material within the target area, using the one or more integrated computational elements;
after determining the initial amount of the deformable material or the reference material within the target area, allowing the structure to undergo deformation in the presence of a deformation force;
after allowing the structure to undergo deformation, determining an amount of the deformable material or the reference material within the target area, using the one or more integrated computational elements; and
correlating a change in amount of the deformable material or the reference material within the target area to a mechanical quantity associated with the deformation force.

18. The method of claim 17, wherein the mechanical quantity comprises a condition selected from the group consisting of strain, stress, thermal expansion, thermal contraction, pressure, and any combination thereof.

19. The method of claim 17, wherein the reference material is present only on a surface of the structure.

20. The method of claim 17, wherein a change in amount of the deformable material, the reference material, or both the deformable material and the reference material is determined, and the change in amount of either or both materials is correlated to the mechanical quantity.

21. The method of claim 17, wherein the deformable material and the reference material are arranged in alternating layers.

22. The method of claim 17, wherein the reference material comprises particulates that are distributed in the deformable material.

23. A sensor comprising:
a structure comprising a deformable material and a reference material within a target area;
one or more integrated computational elements located proximate to the target area; and
a detector configured to receive electromagnetic radiation that has optically interacted with the target area and the one or more integrated computational elements.

* * * * *